US012574486B2

(12) United States Patent
Du et al.

(10) Patent No.: US 12,574,486 B2
(45) Date of Patent: Mar. 10, 2026

(54) STEREOSCOPIC DISPLAY DEVICE AND CONTROL METHOD THEREOF

(71) Applicants: BEIJING BOE DISPLAY TECHNOLOGY CO., LTD., Beijing (CN); BOE TECHNOLOGY GROUP CO., LTD., Beijing (CN); Beijing BOE Technology Development Co., Ltd., Beijing (CN)

(72) Inventors: Hongchuan Du, Beijing (CN); Weifan Yang, Beijing (CN); Xing Zhou, Beijing (CN); Yue Guo, Beijing (CN); Tianhui Zhao, Beijing (CN); Heyang Zhang, Beijing (CN); Jianbo Wang, Beijing (CN)

(73) Assignees: BEIJING BOE DISPLAY TECHNOLOGY CO., LTD., Beijing (CN); BOE TECHNOLOGY GROUP CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 26 days.

(21) Appl. No.: 18/705,143

(22) PCT Filed: Apr. 28, 2023

(86) PCT No.: PCT/CN2023/091595
§ 371 (c)(1),
(2) Date: Apr. 26, 2024

(87) PCT Pub. No.: WO2024/221409
PCT Pub. Date: Oct. 31, 2024

(65) Prior Publication Data
US 2025/0260797 A1 Aug. 14, 2025

(51) Int. Cl.
*H04N 13/229* (2018.01)
*G02B 27/00* (2006.01)
(Continued)

(52) U.S. Cl.
CPC ....... *H04N 13/229* (2018.05); *G02B 27/0012* (2013.01); *H04N 13/383* (2018.05); *H04N 13/398* (2018.05)

(58) Field of Classification Search
CPC .. H04N 13/229; H04N 13/383; H04N 13/398; G02B 27/0012
See application file for complete search history.

(56) References Cited

U.S. PATENT DOCUMENTS 11,579,428 B2 2/2023 Strnad et al.
11,727,833 B2 8/2023 Takahashi
(Continued)

FOREIGN PATENT DOCUMENTS

CN 104820293 A 8/2015
CN 107343193 A 11/2017
(Continued)

*Primary Examiner* — Gims S Philippe
(74) *Attorney, Agent, or Firm* — Westman, Champlin & Koehler, P.A.

(57) ABSTRACT

A stereoscopic display device and a control method thereof are provided. The display device includes: a display substrate, including a base substrate and a plurality of pixel units provided on the base substrate, where the plurality of pixel units are arranged in an array in a first direction and a second direction intersecting with the first direction; a cylindrical lens array located on a light exit side of the display substrate; and a controller configured to: determine a layout period according to a relative positional relationship between a human eye, the cylindrical lens array and the display substrate and according to a refraction of the cylindrical lens array for light emitted by the plurality of pixel (Continued)

units; and control the plurality of pixel units to periodically display a left eye image and a right eye image according to a determined layout period.

19 Claims, 13 Drawing Sheets

(51) Int. Cl.
  *H04N 13/383*        (2018.01)
  *H04N 13/398*        (2018.01)

(56)                    References Cited

U.S. PATENT DOCUMENTS

| | | | | |
|---|---|---|---|---|
| 2005/0083400 A1* | 4/2005 | Hirayama | ............... | H04N 13/31 |
| | | | | 348/E13.043 |
| 2008/0080048 A1* | 4/2008 | Saishu | .............. | G02F 1/133526 |
| | | | | 359/620 |
| 2010/0109979 A1* | 5/2010 | Chen | ....................... | G09G 3/003 |
| | | | | 345/32 |
| 2012/0194751 A1* | 8/2012 | Lo | ........................... | B60J 7/1628 |
| | | | | 349/15 |
| 2014/0240475 A1* | 8/2014 | Shigemura | ............. | G02B 30/34 |
| | | | | 359/464 |
| 2016/0018569 A1* | 1/2016 | Zheng | .................. | G02B 3/0087 |
| | | | | 359/885 |
| 2020/0233194 A1 | 7/2020 | Strnad et al. | | |
| 2020/0341257 A1 | 10/2020 | Levecq et al. | | |
| 2022/0394236 A1* | 12/2022 | Gao | ...................... | H04N 13/305 |
| 2023/0030931 A1 | 2/2023 | Takahashi | | |
| 2023/0093023 A1* | 3/2023 | Chen | .................... | H04N 13/327 |
| | | | | 348/59 |
| 2023/0161142 A1 | 5/2023 | Strnad et al. | | |
| 2024/0061290 A1* | 2/2024 | Sun | ......................... | G02B 30/29 |

FOREIGN PATENT DOCUMENTS

| | | |
|---|---|---|
| CN | 108036929 A | 5/2018 |
| CN | 108881880 A | 11/2018 |
| CN | 108881893 A | 11/2018 |
| CN | 111051954 A | 4/2020 |
| CN | 113867526 A | 12/2021 |
| CN | 114185180 A | 3/2022 |
| WO | 2021132298 A1 | 7/2021 |

* cited by examiner (a)

(b)

(b)

Number of cylindrical lenses (a)

Number of cylindrical lenses

Layout periods corresponding to cylindrical lenses

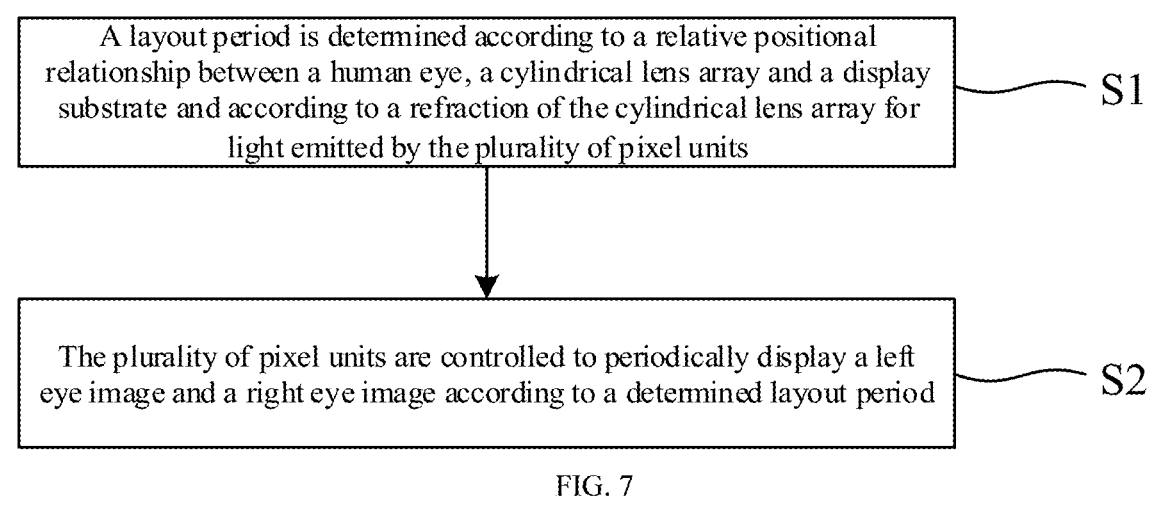

A layout period is determined according to a relative positional relationship between a human eye, a cylindrical lens array and a display substrate and according to a refraction of the cylindrical lens array for light emitted by the plurality of pixel units — S1

The plurality of pixel units are controlled to periodically display a left eye image and a right eye image according to a determined layout period — S2

FIG. 7

STEREOSCOPIC DISPLAY DEVICE AND CONTROL METHOD THEREOF

CROSS-REFERENCE TO RELATED APPLICATION

This application is a Section 371 National Stage Application of International Application No. PCT/CN2023/091595, filed on Apr. 28, 2023, entitled "STEREOSCOPIC DISPLAY DEVICE AND CONTROL METHOD THEREOF", the content of which is hereby incorporated by reference in its entirety.

TECHNICAL FIELD

The present disclosure relates to the field of display technology, and in particular to a stereoscopic display device and a control method thereof.

BACKGROUND

Naked eye 3D stereoscopic display technology has a very important application in the field of display, and may bring more realistic display effects. Therefore, the naked eye 3D stereoscopic display technology is a key research direction for various research institutions and display technology companies, and has a broad application market for medical imaging, education, virtual reality, and other aspects. Due to manufacturing process, manufacturing cost and other factors, naked eye 3D display suffers from problems such as crosstalk and ghosting in display quality, which severely limits a large-scale application of naked eye 3D products.

SUMMARY

In order to address at least one aspect of the aforementioned problems, the embodiments of the present disclosure provide a stereoscopic display device and a control method thereof, which may at least reduce or eliminate a crosstalk problem of a naked eye stereoscopic display device, thereby improving a display effect.

In an aspect, a stereoscopic display device is provided, including: a display substrate, including a base substrate and a plurality of pixel units provided on the base substrate, where the plurality of pixel units are arranged in an array in a first direction and a second direction intersecting with the first direction; a cylindrical lens array located on a light exit side of the display substrate; and a controller configured to: determine a layout period according to a relative positional relationship between a human eye, the cylindrical lens array and the display substrate and according to a refraction of the cylindrical lens array for light emitted by the plurality of pixel units; and control the plurality of pixel units to periodically display a left eye image and a right eye image according to a determined layout period.

In some exemplary embodiments of the present disclosure, the cylindrical lens array includes a plurality of cylindrical lenses arranged in the first direction; a design point on a cylindrical lens corresponds to a first light exit point and a second light exit point on a light exit surface of the display substrate, light emitted from the first light exit point and incident on the design point enters the human eye after being refracted by the cylindrical lens, and the second light exit point, the design point and the human eye are located on a same straight line; and the controller is configured to determine the layout period such that a distance between the first light exit point and the second light exit point in the first direction is less than or equal to a specified value to avoid a crosstalk between images displayed by two adjacent layout units, and the layout unit includes at least one pixel unit configured to display the left eye image or the right eye image, and a plurality of layout units are periodically arranged in the first direction according to the layout period.

In some exemplary embodiments of the present disclosure, the controller is configured to determine a plurality of layout periods, the cylindrical lens array includes a plurality of cylindrical lenses arranged in the first direction, and the plurality of layout periods correspond to the plurality of cylindrical lenses respectively; and at least two cylindrical lenses correspond to different layout periods.

In some exemplary embodiments of the present disclosure, the plurality of cylindrical lenses include a central cylindrical lens, a left cylindrical lens and a right cylindrical lens, the central cylindrical lens is a cylindrical lens for the human eye, and the left cylindrical lens and the right cylindrical lens are two cylindrical lenses closest to edges of the display substrate in the first direction respectively; and the layout periods corresponding to cylindrical lenses in a first group of cylindrical lenses are different from each other, and/or the layout periods corresponding to cylindrical lenses in a second group of cylindrical lenses are different from each other, the first group of cylindrical lenses includes cylindrical lens continuously arranged in the first direction from the central cylindrical lens to the left cylindrical lens, and the second group of cylindrical lenses includes cylindrical lens continuously arranged in the first direction from the central cylindrical lens to the right cylindrical lens.

In some exemplary embodiments of the present disclosure, the layout periods corresponding to the cylindrical lenses in the first group of cylindrical lenses change in a linear continuous manner, and/or the layout periods corresponding to the cylindrical lenses in the second group of cylindrical lenses change in a linear continuous manner.

In some exemplary embodiments of the present disclosure, the layout periods corresponding to the cylindrical lenses in the first group of cylindrical lenses are linearly reduced, and/or the layout periods corresponding to the cylindrical lenses in the second group of cylindrical lenses are linearly reduced.

In some exemplary embodiments of the present disclosure, the layout periods corresponding to the cylindrical lenses in the first group of cylindrical lenses change in a non-linear continuous manner, and/or the layout periods corresponding to the cylindrical lenses in the second group of cylindrical lenses change in a non-linear continuous manner.

In some exemplary embodiments of the present disclosure, the layout periods corresponding to the cylindrical lenses in the first group of cylindrical lenses are non-linearly reduced, and/or the layout periods corresponding to the cylindrical lenses in the second group of cylindrical lenses are non-linearly reduced.

In some exemplary embodiments of the present disclosure, the controller is configured to determine a plurality of layout periods, the cylindrical lens array includes a plurality of cylindrical lenses arranged in the first direction, and the plurality of layout periods correspond to the plurality of cylindrical lenses respectively; and at least two cylindrical lenses correspond to the same layout period.

In some exemplary embodiments of the present disclosure, the plurality of cylindrical lens correspond to a same layout period.

In some exemplary embodiments of the present disclosure, each cylindrical lens corresponds to a layout period less than a layout period determined by:

$$\Delta x = P \times \frac{E_z + h}{E_z}$$

where $E_z$ represents a viewing distance between the human eye and the stereoscopic display device, P represents a pitch of adjacent cylindrical lenses, and h represents an equivalent air distance between the cylindrical lens and the display unit.

In some exemplary embodiments of the present disclosure, the plurality of cylindrical lenses include a central cylindrical lens, a first intermediate cylindrical lens, a second intermediate cylindrical lens, a left cylindrical lens and a right cylindrical lens, the central cylindrical lens is a cylindrical lens for the human eye, the left cylindrical lens and the right cylindrical lens are two cylindrical lenses closest to edges of the display substrate in the first direction, the first intermediate cylindrical lens and the second intermediate cylindrical lens are located on both sides of the central cylindrical lens, the first intermediate cylindrical lens is located between the central cylindrical lens and the left cylindrical lens, and the second intermediate cylindrical lens is located between the central cylindrical lens and the right cylindrical lens; and each cylindrical lens in the first group of cylindrical lenses corresponds to a first layout period, each cylindrical lens in the second group of cylindrical lenses corresponds to a second layout period different from the first layout period, the first group of cylindrical lenses includes cylindrical lenses arranged continuously in the first direction from the first intermediate cylindrical lens to the second intermediate cylindrical lens, the second group of cylindrical lenses includes cylindrical lenses arranged continuously in the first direction from the first intermediate cylindrical lens to the left cylindrical lens and cylindrical lenses arranged continuously in the first direction from the second intermediate cylindrical lens to the right cylindrical lens.

In some exemplary embodiments of the present disclosure, the first layout period is greater than the second layout period.

In some exemplary embodiments of the present disclosure, the stereoscopic display device further includes: a human eye tracking module configured to track a position of the human eye; where the controller is further configured to determine the relative positional relationship between the human eye, the cylindrical lens array and the display substrate according to a tracked position of the human eye.

In some exemplary embodiments of the present disclosure, the controller is further configured to: determine layout periods and layout period change rates for a plurality of predetermined viewing distances respectively; establish a mapping relationship between the layout period change rate for each predetermined viewing distance and each cylindrical lens; acquire a position of the human eye in real time to determine a real-time viewing distance; determine a mapping relationship between the layout period change rate for a predetermined viewing distance closest to the determined real-time viewing distance and each cylindrical lens as a mapping relationship between the layout period change rate for the real-time viewing distance and each cylindrical lens; and calculate the layout period corresponding to each cylindrical lens for the real-time viewing distance according to the mapping relationship between the layout period change rate for the real-time viewing distance and each cylindrical lens.

In some exemplary embodiments of the present disclosure, the layout period corresponding to each cylindrical lens in the first group of cylindrical lenses is linearly negatively correlated with a first distance, and the first distance is a distance between each cylindrical lens in the first group of cylindrical lenses and the central cylindrical lens; and/or the layout period corresponding to each cylindrical lens in the second group of cylindrical lenses is linearly negatively correlated with a second distance, and the second distance is a distance between each cylindrical lens in the second group of cylindrical lenses and the central cylindrical lens.

In some exemplary embodiments of the present disclosure, a linear correlation determined by the controller meets:

$$\Delta x = \alpha \times \frac{\Delta x_{max} - \Delta x_{min}}{k_{max} - k_{min}} \times k$$

where $\alpha$ is a correction coefficient, $$\Delta x_{max} = P \times \frac{E_z + h}{E_z},$$

$\Delta x_{min}$ represents a layout period corresponding to a maximum allowable pitch of the cylindrical lenses, and k represents a number of the cylindrical lenses from the central cylindrical lens in the first group of cylindrical lenses or the second group of cylindrical lenses.

In some exemplary embodiments of the present disclosure, the layout period corresponding to each cylindrical lens in the first group of cylindrical lenses is a pitch of two layout units corresponding to two adjacent cylindrical lenses; and/or the layout period corresponding to each cylindrical lens in the second group of cylindrical lenses is a pitch of two layout units corresponding to two adjacent cylindrical lenses.

In some exemplary embodiments of the present disclosure, the layout period corresponding to each cylindrical lens in the first group of cylindrical lenses and/or the layout period corresponding to each cylindrical lens in the second group of cylindrical lenses meet:

$$y_k(k) = k \times P + \frac{h}{\sqrt{1 - \frac{1}{n^2} + \left(\frac{E_z}{k \times P}\right)^2}} ; (k > 0)$$

$$\Delta x = y_k(k) - y_k(k - 1)$$

where P represents a pitch of adjacent cylindrical lenses, h represents an equivalent air distance between the cylindrical lens and the display unit, n represents a ratio of a refractive index $n_2$ of the cylindrical lens to a refractive index $n_1$ of a first dielectric layer, and $E_x$ represents a distance between the human eye and the central cylindrical lens in the first direction.

In some exemplary embodiments of the present disclosure, a distance $y_k$ between the first light exit point corresponding to the design point of the cylindrical lens and the central cylindrical lens meets:

$$y_k(k) = k \times P + hn\tan\theta_2$$

where $\theta_2$ represents an angle between a light ray in the cylindrical lens and a normal line.

In some exemplary embodiments of the present disclosure, a distance $y_{no}$ between the second light exit point corresponding to the design point of the cylindrical lens and the central cylindrical lens meets:

$$y_{no}(k) = (k-1) \times \Delta x + E_x \bmod \Delta x; \ E_x > 0$$

$$y_{no}(k) = k \times \Delta x + E_x \bmod \Delta x; \ E_x < 0$$

where $E_x$ represents a distance between the human eye and the central cylindrical lens in the first direction.

In some exemplary embodiments of the present disclosure, a distance between the first light exit point corresponding to the design point of the cylindrical lens and the central cylindrical lens, the first layout period $\Delta x1$ in the first group of cylindrical lenses and the second layout period $\Delta x2$ in the second group of cylindrical lenses meet:

$$\begin{cases} \gamma_{k=k_{max}}(k) - k_{max}\Delta x1 = -M \\ \gamma_{k=k_{max}}(k) - k_{max}\Delta x2 = M \end{cases}$$

where M is the specified value, $k_{max}$ represents a number of cylindrical lenses from the central cylindrical lens to the first intermediate cylindrical lens or to the second intermediate cylindrical lens, $\Delta x1$ represents the layout period corresponding to the first group of cylindrical lenses, and $\Delta x2$ represents the layout period corresponding to the second group of cylindrical lenses.

In another aspect of the present disclosure, a control method for a stereoscopic display device is provided, where the stereoscopic display device includes: a display substrate, including a base substrate and a plurality of pixel units provided on the base substrate, where the plurality of pixel units are arranged in an array in a first direction and a second direction intersecting with the first direction; and a cylindrical lens array located on a light exit side of the display substrate; the control method including: determining a layout period according to a relative positional relationship between a human eye, the cylindrical lens array and the display substrate and according to a refraction of the cylindrical lens array for light emitted by the plurality of pixel units; and controlling the plurality of pixel units to periodically display a left eye image and a right eye image according to a determined layout period.

In some exemplary embodiments of the present disclosure, the control method further includes: tracking a position of the human eye; and determining the relative positional relationship between the human eye, the cylindrical lens array and the display substrate according to a tracked position of the human eye.

BRIEF DESCRIPTION OF THE DRAWINGS

With the following description of the present disclosure with reference to the drawings, other objectives and advantages of the present disclosure may be obvious, and the present disclosure may be understood comprehensively. In the drawings:

FIG. 7 schematically shows a flowchart diagram of a control method for a stereoscopic display substrate in an exemplary embodiment of the present disclosure.

Figure 1A:
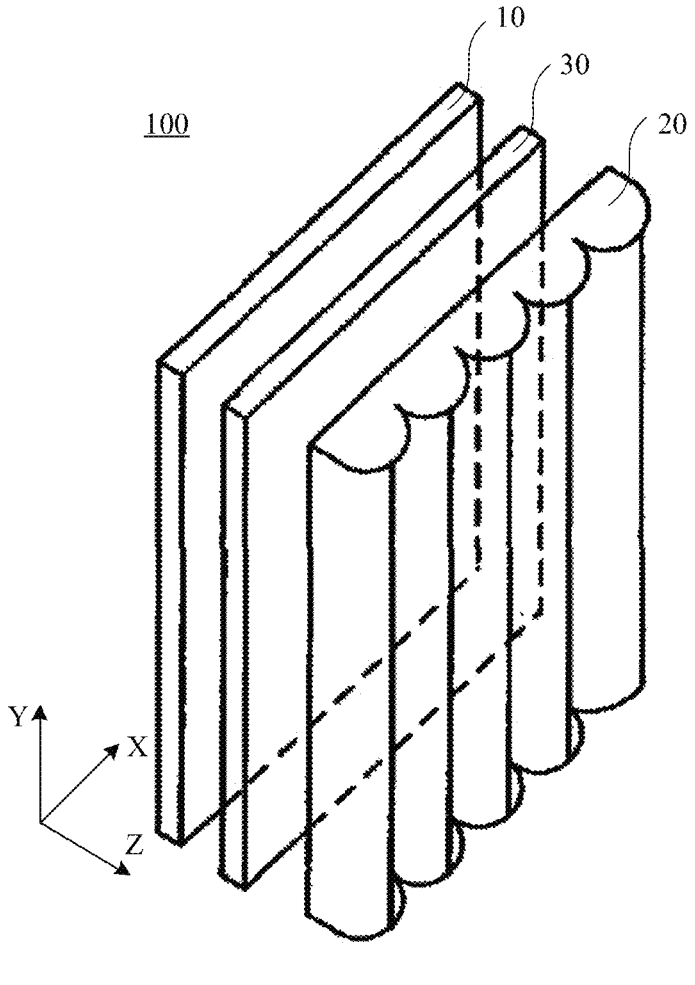
FIG. 1A schematically shows a schematic diagram of a three-dimensional structure of a stereoscopic display substrate in an exemplary embodiment of the present disclosure.

It should be noted that for the sake of clarity, in the drawings used to describe the embodiments of the present disclosure, sizes of layers, structures or regions may be enlarged or reduced, that is, those drawings are not drawn according to actual scale.

DETAILED DESCRIPTION OF EMBODIMENTS

Technical solutions of the present disclosure will be further described in detail below through the embodiments with reference to the drawings. In the specification, the same or similar reference numerals represent the same or similar components. The following descriptions of the embodiments of the present disclosure with reference to the drawings are intended to explain a general inventive concept of the present disclosure, and should not be understood as a limitation to the present disclosure.

In addition, in the following detailed descriptions, for convenience of explanation, many specific details are set forth to provide comprehensive understanding of the embodiments of the present disclosure. However, it is clear that one or more embodiments may also be implemented without these specific details.

It should be noted that although the terms "first", "second", and so on may be used herein to describe various components, members, elements, regions, layers and/or portions, these components, members, elements, regions, layers and/or portions should not be limited by these terms. Rather, these terms are used to distinguish one component, member, element, region, layer and/or portion from another one. Thus, for example, a first component, a first member, a first element, a first region, a first layer and/or a first portion discussed below may be referred to as a second component, a second member, a second element, a second region, a second layer and/or a second portion without departing from teachings of the present disclosure.

For ease of description, spatial relationship terms, such as "upper", "lower", "left", "right", may be used herein to describe a relationship between an element or feature and another element or feature as shown in the drawings. It should be understood that the spatial relationship terms are intended to cover other different orientations of a device in use or operation in addition to the orientation described in the drawings. For example, if a device in the drawings is turned upside down, an element or feature described as "below" or "under" another element or feature will be oriented "above" or "on" the another element or feature.

Here, the terms "substantially", "about", "approximately", "roughly" and other similar terms are used as terms of approximation rather than terms of degree, and they are intended to explain an inherent deviation of a measured or calculated value that will be recognized by those ordinary skilled in the art. Taking into account a process fluctuation, a measurement problem, an error related to a measurement of a specific quantity (that is, a limitation of a measurement system) and other factors, the terms "about" or "approximately" used herein includes a stated value and means that a specific value determined by those ordinary skilled in the art is within an acceptable range of deviation. For example, "about" may mean being within one or more standard deviations, or within ±30%, ±20%, ±10% or ±5% of the stated value.

It should be noted that the expressions "same layer" herein refer to a layer structure that is formed by firstly forming, using a same film forming process, a film layer used to form a specific pattern, and then patterning, using one-time patterning process, the film layer with a same mask. Depending on different specific patterns, the one-time patterning process may include a plurality of exposure, development or etching processes, and the specific pattern in the formed layer structure may be continuous or discontinuous. That is, a plurality of elements, components, structures and/or portions located in the "same layer" are made of the same material and formed by the same patterning process. Generally, a plurality of elements, components, structures and/or portions located in the "same layer" have substantially the same thickness.

Those skilled in the art should understand that, unless otherwise specified, the expressions "continuously extending", "integral structure", "overall structure" or similar expressions herein mean that a plurality of elements, components, structures and/or portions are located in the same layer and generally formed by the same patterning process during the manufacturing process, and that these elements, components, structures and/or portions are not separated or broken, but are formed as a continuously extending structure.

Herein, directional expressions "first direction" and "second direction" are used to describe different directions along a pixel region, e.g., a longitudinal direction and a lateral direction of the pixel region. It should be understood that such expressions are just exemplary descriptions and are not limitations to the present disclosure.

Herein, the term "periodic pixel width" refers to a width of an image or picture displayed by a display unit that enters a left eye or right eye of a viewer after being refracted by a cylindrical lens in a cylindrical lens array. Each periodic pixel width refers to a width of a display unit that may be viewed by the left eye or right eye of the viewer through a cylindrical lens, where the images or pictures seen by the left eye and the right eye are displayed alternately on the display unit.

Herein, the term "design point" refers to a specific point on a cylindrical lens used to set a pitch of the cylindrical lens. For example, the design point may be a central point of the cylindrical lens.

The term "layout period" refers to a width of a pixel unit of a display unit seen by the human eye on a display substrate through a cylindrical lens. In the embodiments of the present disclosure, the layout period is related to an angle between the human eye and the cylindrical lens. In a case of a different viewing angle of the human eye with respect to the cylindrical lens, a different width of the pixel unit of the display unit may be seen through the cylindrical lens.

Stereoscopic display devices currently produced on the market suffer from problems of crosstalk and ghosting, especially in large viewing angle regions. This leads to a problem that an optimal viewing angle is too small.

Existing methods may reduce crosstalk to some extent, but fail to solve the problem of crosstalk in a close distance and a large viewing angle. The problems of limited viewing distance and small optimal viewing angle may greatly reduce user experience, where the small viewing angle means that the viewer needs to be within a small range of a horizontal distance with respect to a screen in order to view an image with an optimal effect, and a viewing effect may deteriorate in a case of going beyond the range; the limited viewing distance means that the viewer needs to be at a distance not too close to the stereoscopic display.

To address the aforementioned problems, the embodiments of the present disclosure provide a stereoscopic display device. The stereoscopic display device includes but is not limited to: a display substrate, where the display substrate includes a base substrate and a plurality of pixel units provided on the base substrate, and the plurality of pixel units are arranged in an array in a first direction and a second direction interesting with the first direction; a cylindrical lens array located on a light exit side of the display substrate; and a controller used to: determine a layout period according to a relative positional relationship between a human eye, the cylindrical lens array and the display substrate and according to a refraction of the cylindrical lens array for light emitted by the plurality of pixel units; and control the plurality of pixel units to periodically display a left eye image and a right eye image according to a determined layout period.

According to the embodiments of the present disclosure, by providing the controller to control the layout period of the plurality of pixel units according to the relative positional relationship between the human eye, the cylindrical lens array and the display substrate, the human eye may have the optimal viewing experience at all positions, the crosstalk generated during viewing of human eye may be reduced, and a display effect may be improved.

A naked eye 3D display substrate of the embodiments of the present disclosure will be described in detail below with reference to FIG. 1A to FIG. 7.

Figure 1B:
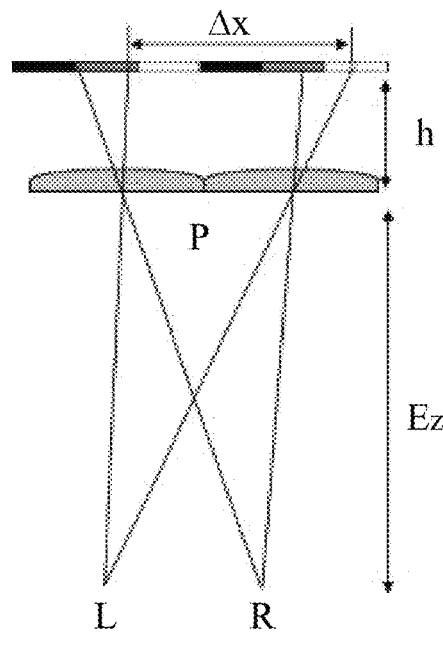
FIG. 1B schematically shows a schematic diagram of a relationship between an actual layout period and a theoretical layout period of a stereoscopic display substrate in an exemplary embodiment of the present disclosure.
Figure 1B:
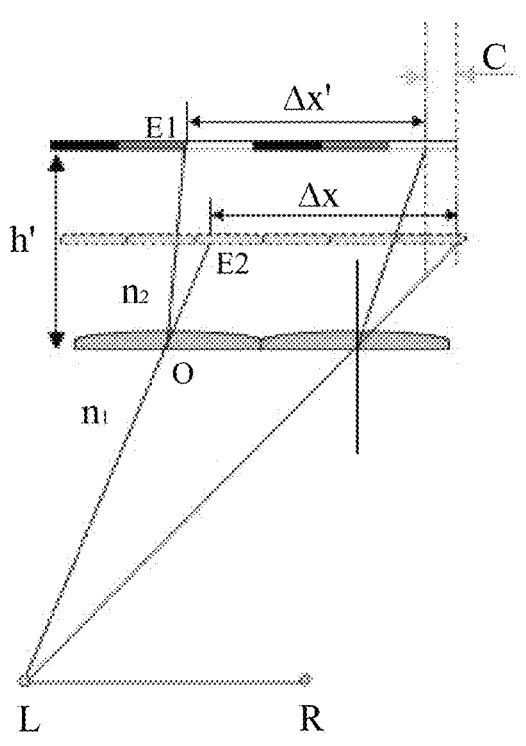
Figure 1C:
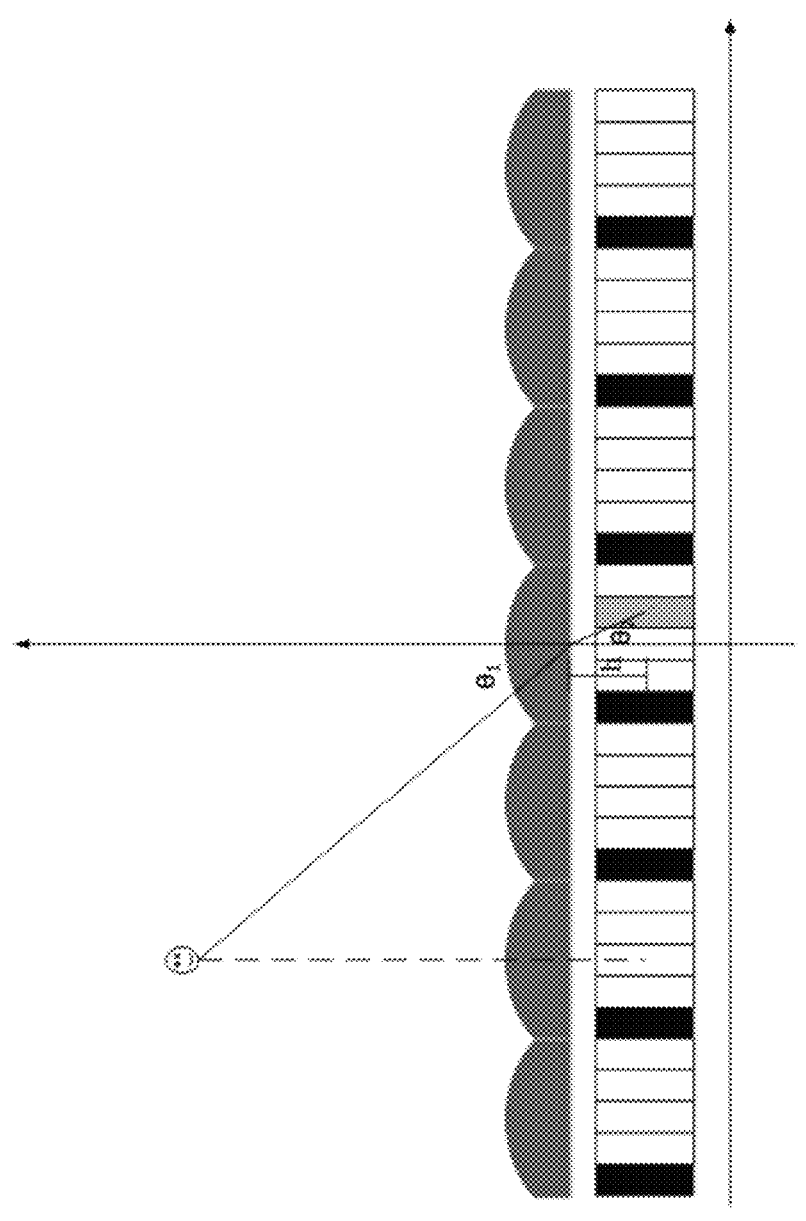
FIG. 1C schematically shows a schematic diagram of a refraction of a cylindrical lens in a stereoscopic display substrate in an exemplary embodiment of the present disclosure.
Figures 1D, 1E:
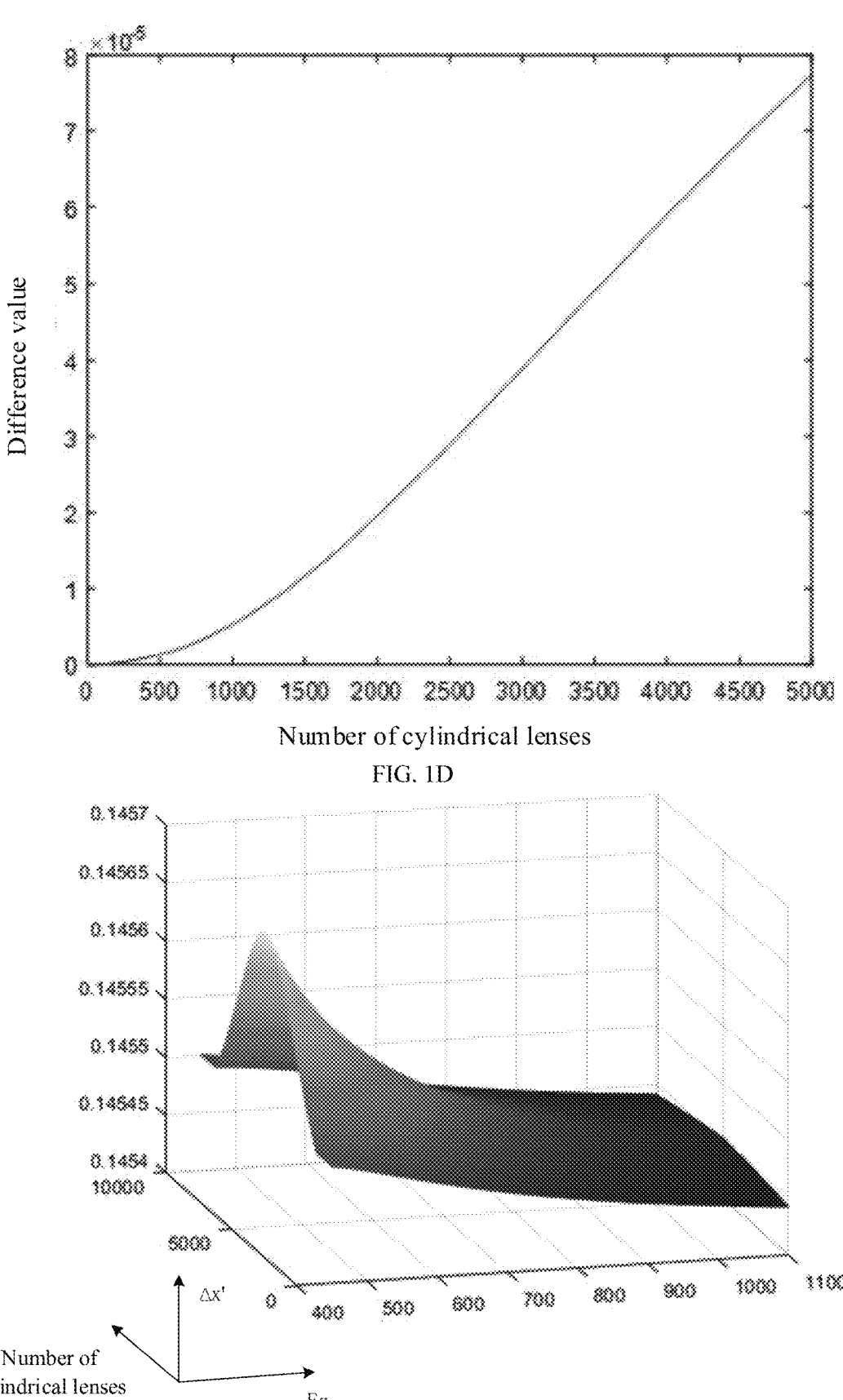
FIG. 1D schematically shows a schematic diagram of a change curve of a difference value between the actual layout period and the theoretical layout period of the stereoscopic display substrate in an exemplary embodiment of the present disclosure.
FIG. 1E schematically shows a schematic diagram of a change in the actual layout period of the stereoscopic display substrate in a first direction and a third direction in an exemplary embodiment of the present disclosure.
Figures 2A, 2B:
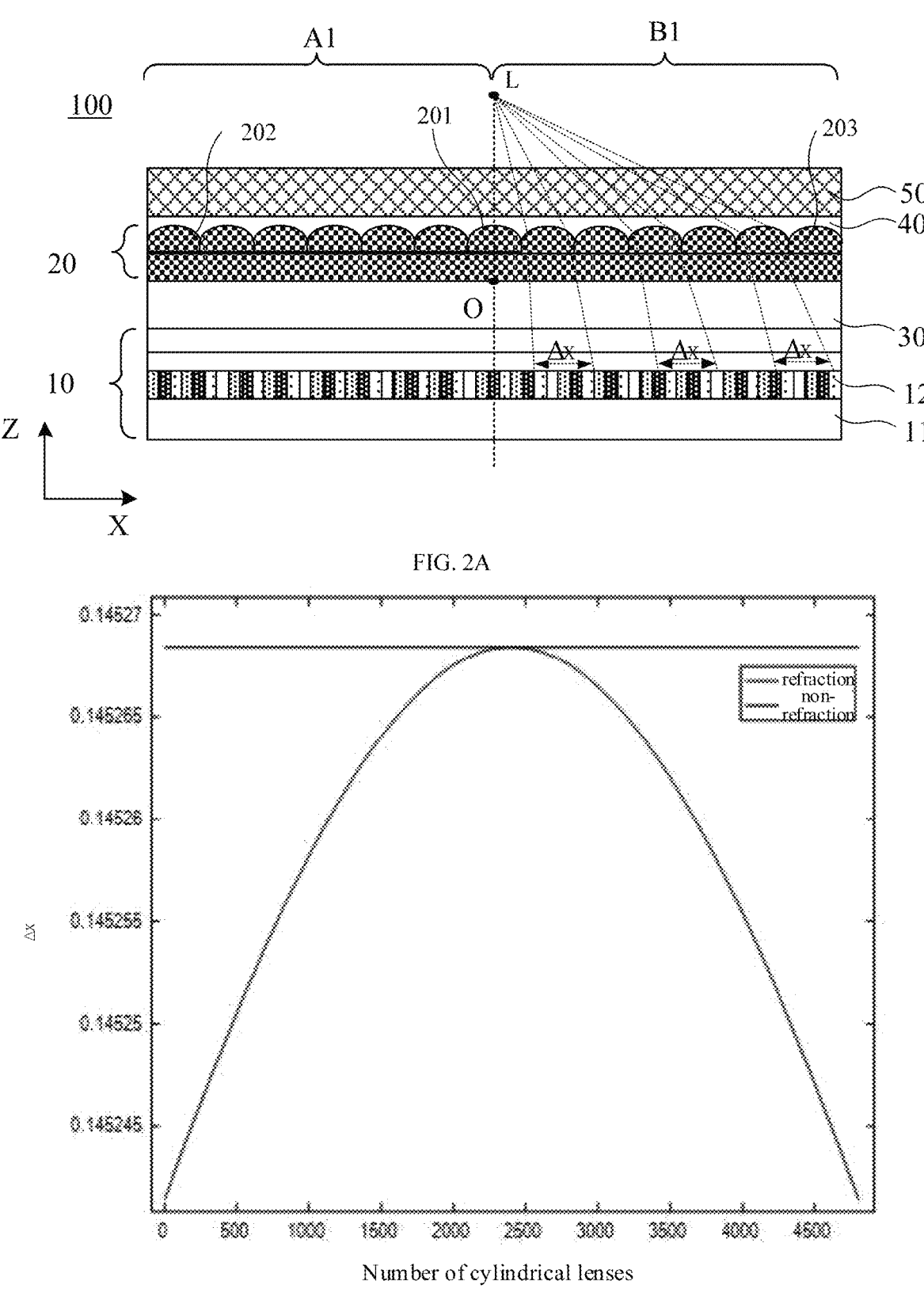
FIG. 2A schematically shows a schematic diagram of a cross-sectional structure of a stereoscopic display substrate in an embodiment of the present disclosure.
FIG. 2B schematically shows a schematic diagram of a change curve of a number of cylindrical lenses and a theoretical layout period of a stereoscopic display substrate in an embodiment of the present disclosure.

FIG. 1A schematically shows a schematic diagram of a three-dimensional structure of a stereoscopic display substrate in an exemplary embodiment of the present disclosure. FIG. 1B schematically shows a schematic diagram of a relationship between an actual layout period and a theoretical layout period of a stereoscopic display substrate in an exemplary embodiment of the present disclosure. FIG. 1C schematically shows a schematic diagram of a refraction of a cylindrical lens in a stereoscopic display substrate in an exemplary embodiment of the present disclosure. FIG. 1D schematically shows a schematic diagram of a change curve of a difference value between the actual layout period and the theoretical layout period of the stereoscopic display substrate in an exemplary embodiment of the present disclosure. FIG. 1E schematically shows a schematic diagram of a change in the actual layout period of the stereoscopic display substrate in a first direction and a third direction in an exemplary embodiment of the present disclosure. FIG. 2A schematically shows a schematic diagram of a cross-sectional structure of a stereoscopic display substrate in an embodiment of the present disclosure.

As shown in FIG. 1A and FIG. 2A, a stereoscopic display substrate 100 includes a display substrate 10, a cylindrical lens array 20 provided on a light exit side of the display substrate 10, and a first dielectric layer 30 provided between the display substrate 10 and the cylindrical lens array 20. The first dielectric layer 30 is used to bond the display substrate 10 with the cylindrical lens array 20, and to provide an appropriate distance between the display substrate 10 and the cylindrical lens array 20, so that a picture displayed by a pixel unit on the display substrate 10 may be displayed as a corresponding picture on a left eye or right eye of the human eye through the cylindrical lens array 20, respectively. As shown in FIG. 2A, the stereoscopic display substrate 100 may further include a second dielectric layer 40 and a packaging layer 50. The second dielectric layer 40 may be made of the same material as the first dielectric layer 30, or may be made of other dielectric materials. For example, the second dielectric layer 40 may be made of a material having a low refractive index. The packaging layer 50 is used to package and protect the stereoscopic display device 100 to prevent an environmental damage to an internal film layer of the stereoscopic display device. In other optional embodiments, at least one of the second dielectric layer 40 or the packaging layer 50 may be provided selectively.

The display substrate includes a base substrate 11 and a plurality of pixel units 12 provided on the base substrate. The pixel units are arranged in an array in a first direction X and a second direction Y intersecting with the first direction X. The display substrate 10 and the cylindrical lens array 20 are stacked in a third direction Z.

A technical principle of this solution will be described in detail below with reference to FIG. 1B to FIG. 1E.

During a display process of the display device 100, the cylindrical lens array in the display device and the medium between the cylindrical lens and the display substrate may exhibit refraction, so that an actual optical path is different from a designed optical path, which may lead to a severe crosstalk at a close range and a large viewing angle. With reference to FIG. 1B and FIG. 2A, the cylindrical lens array 20 includes a plurality of cylindrical lenses 21 arranged in the first direction X, and a length direction of the plurality of cylindrical lenses is along the second direction Y. A design point O1 on a cylindrical lens corresponds to a first light exit point E1 and a second light exit point E2 on a light exit surface of the display substrate. The light emitted from the first light exit point E1 and incident on the design point O1 may enter the human eye L (such as the left eye) after being refracted by the cylindrical lens 21. The second light exit point E2, the design point O1 and the human eye L are located on a same straight line.

When designing the layout period of the display device, the influence of the refractive index of the cylindrical lens and the medium surrounding the cylindrical lens is generally not considered in the design. Therefore, a layout period Δx (theoretical layout period) generally designed is different from a layout period Δx' (actual layout period) considering the influence of the refractive index of the cylindrical lens and the medium surrounding the cylindrical lens. As shown in (b) of FIG. 1B, the first light exit point E1 is a light exit point corresponding to the left eye that considers the influence of the cylindrical lens refraction, and the second light exit point E2 is a light exit point corresponding to the left eye that does not consider the influence of the cylindrical lens refraction. There is a difference value C between the theoretical layout period Δx and the actual layout period Δx', and as shown in FIG. 1D, the difference value C may increase with an increase in a distance between the cylindrical lens and the human eye. Therefore, at a large viewing angle, due to the difference value between the theoretical layout period Δx and the actual layout period Δx', a crosstalk may be generated when other pixels at a large viewing angle are viewed by the human eye, which results in a decrease in the display effect of the display device. In order to reduce crosstalk, it is needed to minimize the difference value C between the theoretical layout period Δx and the actual layout period Δx' displayed on the display device.

The refraction of the cylindrical lens and the medium surrounding the cylindrical lens may cause a severe crosstalk at a close distance. The influence of the refraction caused by the distance between the human eye and the display device may be determined through all actual layout periods in a range of distance [450 mm, 1100 mm] and angle [−25°, 25°]. As shown in FIG. 1E, at a close distance, the actual layout period at a small viewing angle and the actual layout period at a large viewing angle change sharply with a large difference in numeric values, so that a severe crosstalk is generated at a close distance. In view of this, the display device of the present disclosure is improved for the crosstalk at a close distance. For example, the close distance may be in a range of 450 mm to 1100 mm. In other application scenarios of small screens, with an increase in a screen resolution, the pixels of the display unit become smaller, that is, a distance between pixels becomes smaller, and a change in the refractive index is more likely to cause a crosstalk. For example, a small change in the viewing angle or a small change in the human eye position may also cause a crosstalk between pixels.

It should be noted that in the embodiments shown in FIG. 1E, the "viewing angle [−25°, 25°]" here means that: when the position of the viewer faces a cylindrical lens with a middle sequence number, if a gaze point of the human eye faces the cylindrical lens with the middle sequence number, for example, a cylindrical lens with the sequence number of about 5000, the viewing angle is 0°; if the gaze point of the human eye faces a cylindrical lens located on both sides, for example, a cylindrical lens with the sequence number of about 0, the viewing angle is −25°, or if the gaze point of the human eye is directed towards a cylindrical lens with the sequence number of about 10000, the viewing angle is 25°. It should be noted that the description here is just illustrative. When the position of the viewer and the number of cylindrical lenses change, the viewing angle may change accordingly.

Therefore, the display device of the present disclosure is provided with a controller which is configured to determine the layout period such that a distance between the first light exit point E1 and the second light exit point E2 in the first direction X is less than or equal to a specified value, so as to avoid a crosstalk between the images displayed by two adjacent layout units. The layout units include at least one pixel unit that displays a left eye image or a right eye image, and a plurality of layout units are periodically arranged in the first direction according to the layout period. For example, the controller may be an FPGA, which may achieve a good processing effect based on low computational costs. That is, the controller of the present disclosure may control the pixel units on the display substrate of the display device, so that the difference value C between the theoretical layout period $\Delta x$ and the actual layout period $\Delta x'$ of the pixel units on the display substrate is less than the specified value, thereby effectively eliminating crosstalk of the display device.

In some embodiments of the present disclosure, the specified value may be a crosstalk limit M determined according to an actual display situation. For example, the crosstalk limit M is associated with a width of the pixel unit in the first direction. For example, when the distance between the first light exit point E1 and the second light exit point E2 in the first direction is greater than the crosstalk limit M, it is considered that the image viewed by the human eye has crosstalk. If the difference value C is less than or equal to the crosstalk limit M, it is considered that the image viewed by the human eye has no crosstalk. In such embodiments, the crosstalk limit M may be ⅔ of the width of the pixel unit in the first direction, i.e., M=⅔ pixel.

In some embodiments of the present disclosure, the controller may determine a plurality of layout periods according to the relative positional relationship between the human eye, the cylindrical lens array and the display substrate. The plurality of layout periods correspond to the plurality of cylindrical lenses respectively.

Exemplarily, the layout period $\Delta x$ of the display device may be calculated by Equation (1).

$$\Delta x = P \times \frac{E_z + h}{E_z} \tag{1}$$

where P represents a horizontal width of the cylindrical lens or a pitch of adjacent cylindrical lenses, $E_z$ represents a position coordinate of the human eye in the third direction Z, which is the distance between the human eye and the display device, and h represents an equivalent air layer placement height of the cylindrical lens array.

In such embodiments, the position coordinate of the human eye with respect to the display device in the third direction Z is $E_z$. The coordinates of the position of the human eye (such as the left eye L) in the first direction X, the second direction Y and the third direction Z are determined as (0, 0, $E_z$). With an increase in a distance between the cylindrical lens and the human eye in the first direction X, as shown in (a) and (b) in FIG. 1B, the distance between the first light exit point E1 and the second light exit point E2 corresponding to the design point of the cylindrical lens in the first direction X increases. In order to prevent crosstalk, the controller may control the layout period corresponding to each cylindrical lens of the display device, so that the distance between the first light exit point E1 and the second light exit point E2 in the first direction X is less than or equal to the specified value. That is, the first light exit point, the second light exit point and the specified value M meet Equation (2).

$$\text{rate } (k) = \frac{|y_k(k) - y_{no}(k)|}{M} \le 1 \tag{2}$$

where the cylindrical lens corresponding to the human eye position is a central cylindrical lens, $y_k(k)$ represents a distance between the first light exit point E1 corresponding to the design point of a $k^{th}$ cylindrical lens and the central cylindrical lens corresponding to the human eye position in the first direction, and $y_{no}(k)$ represents a distance between the second light exit point E2 corresponding to the design point of the $k^{th}$ cylindrical lens and the central cylindrical lens corresponding to the human eye position in the first direction. In the embodiments of the present disclosure, when rate (k) is always less than or equal to 1, it may be considered that the display device may not exhibit crosstalk when the human eye is located within the above-mentioned coordinate range.

As shown in FIG. 1B and FIG. 1C, $y_k(k)$ may be calculated by Equation (3).

$$y_k(k) = k \times P + hn \tan \theta_2 \tag{3}$$

where P represents a horizontal width of the cylindrical lens or a pitch of adjacent cylindrical lenses, and h represents an equivalent air layer placement height of the cylindrical lens array. As shown in (b) of FIG. 1B, h may be determined according to a distance h′ between the cylindrical lens array and the display substrate. n represents a ratio of a refractive index $n_2$ of a lens to a refractive index $n_1$ of a medium surrounding the lens. As shown in FIG. 1B and FIG. 1C, $n_1$ represents the refractive index of the medium surrounding the lens, and $n_2$ represents the refractive index of the lens. $\theta_1$ represents an angle between a light ray in the medium surrounding the lens and a normal line, and $\theta_2$ represents an angle between a light ray in the lens and the normal line.

By transforming Equation (3) based on Equation (4) and Equation (5), Equation (6) may be obtained.

$$\sin\theta_1 \times n_1 = \sin\theta_2 \times n_2 \qquad (4)$$

$$n = \frac{n_2}{n_1} \qquad (5)$$

$$y_k(k) = k \times P + hn \tan\left(\arcsin\left(\frac{1}{n} \times \frac{k \times P - E_x}{\sqrt{(k \times P - E_x)^2 + E_z^2}}\right)\right) \qquad (6)$$

$y_{no}(k)$ represents the distance between the second light exit point corresponding to the design point of the $k^{th}$ cylindrical lens and the human eye position in the first direction, which may be calculated according to Equation (7) and Equation (8).

$$y_{no}(k) = (k - 1) \times \Delta x + E_x \bmod \Delta x; \, E_x > 0 \qquad (7)$$

$$y_{no}(k) = k \times \Delta x + E_x \bmod \Delta x; \, E_x < 0 \qquad (8)$$

where $E_x$ represents a distance between the $k^{th}$ cylindrical lens and the central cylindrical lens corresponding to the human eye.

Figure 2C:
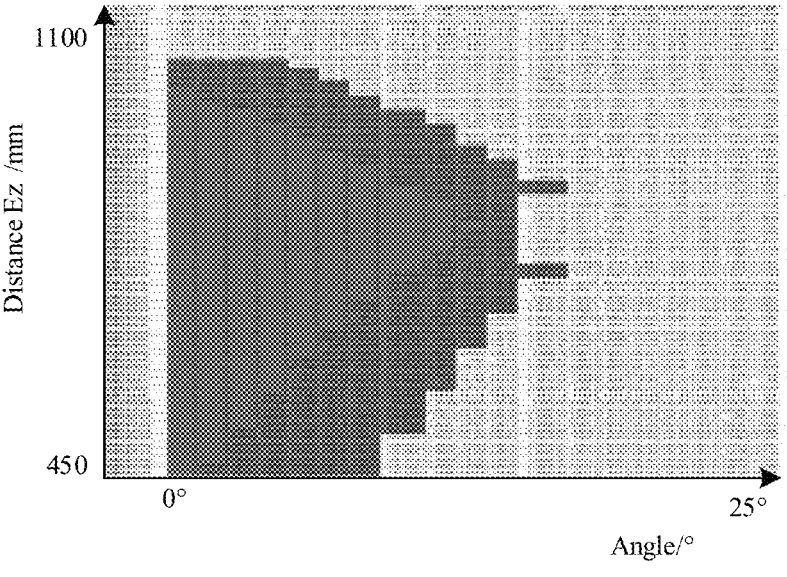
FIG. 2C and FIG. 2D schematically show a comparison diagram of a crosstalk cancellation on a stereoscopic display substrate in the exemplary embodiments of the present disclosure.
Figure 2D:
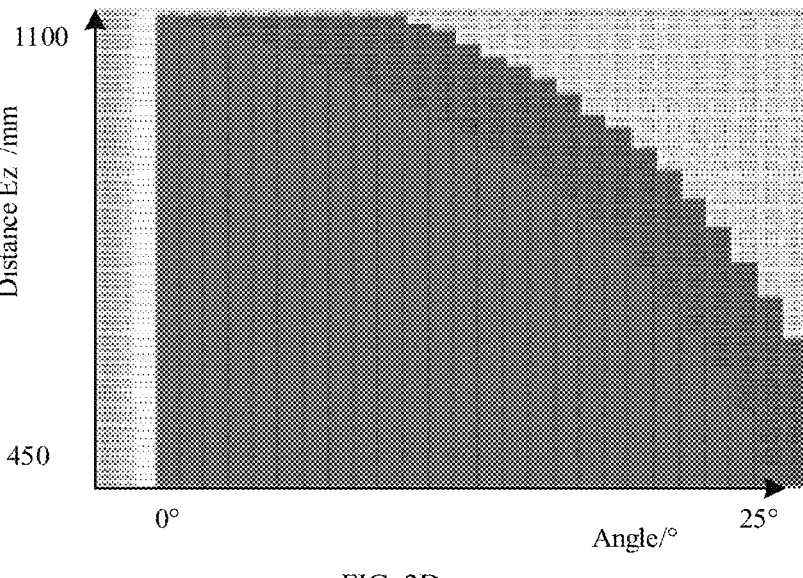

FIG. 2A schematically shows a schematic diagram of a cross-sectional structure of a stereoscopic display substrate in an embodiment of the present disclosure. FIG. 2B schematically shows a schematic diagram of a change curve of a number of cylindrical lenses and a theoretical layout period of a stereoscopic display substrate in an embodiment of the present disclosure. FIGS. 2C and 2D schematically show a comparison diagram of a crosstalk cancellation on a stereoscopic display substrate of exemplary embodiments of the present disclosure.

The display device of the embodiments of the present disclosure will be described in detail below with reference to FIG. 2A.

In an exemplary embodiment of the present disclosure, the controller is configured to determine a plurality of layout periods $\Delta x$. The cylindrical lens array includes a plurality of cylindrical lenses arranged in the first direction. The plurality of layout periods correspond to the plurality of cylindrical lenses respectively, and at least two cylindrical lenses correspond to the same layout period. That is, the plurality of cylindrical lenses arranged in the first direction may all correspond to the same layout period, or some cylindrical lenses correspond to the same layout period while the others correspond to a different layout period.

As shown in FIG. 2A, the stereoscopic display substrate 100 includes a display substrate 10, a cylindrical lens array 20, a first dielectric layer 30, a second dielectric layer 40, and a packaging layer 50. The stereoscopic display substrate includes a central cylindrical lens facing the human eye, and a left cylindrical lens 202 and a right cylindrical lens 203 located on both sides of the stereoscopic display substrate.

Exemplarily, the layout period of the cylindrical lens without considering refraction is calculated by Equation (1) mentioned above. For example, if the human eye faces the central cylindrical lens of the display substrate and the distance $E_z$ between the human eye and the display substrate is 700 mm, then the coordinates of the human eye are (0, 0, 700 mm). As shown in FIG. 2B, it is known that the cylindrical lens array of the display device includes 5000 cylindrical lenses arranged in the first direction X from a left side of the display substrate to a right side of the display substrate, and a $2500^{th}$ cylindrical lens is the central cylindrical lens. From the central cylindrical lens to both sides, with an increase in the distance between the cylindrical lens and the human eye in the first direction X, the difference value between the actual layout period $\Delta x'$ and the theoretical layout period $\Delta x$ also increases. In order to reduce the difference value between the actual layout period $\Delta x'$ and the theoretical layout period $\Delta x$ on both sides and in the middle, it is possible to fixedly set the layout period corresponding to the cylindrical lens, that is, the plurality of cylindrical lenses arranged in the first direction correspond to the same layout period.

For example, the distance $y_k(k)$ between the first light exit point corresponding to the design point of the $k^{th}$ cylindrical lens and the central cylindrical lens 201 corresponding to the human eye in the first direction may be calculated according to Equation (3) to Equation (6) described above, where k is a variable and P is the known width of the cylindrical lens. The distance $y_{no}(k)$ between the second light exit point corresponding to the design point of the $k^{th}$ cylindrical lens and the human eye in the first direction X may be calculated by combining Equation (7) and Equation (8).

A value of an optimal theoretical layout period $\Delta x$ corresponding to the coordinate of $E_z$ in the third direction of the human eye may be calculated according to Equation (2). The controller needs to control the display layout period $\Delta x$ and display the layout periods on the display substrate corresponding to all cylindrical lenses as the above-mentioned calculated $\Delta x$, so that a best display effect may be achieved.

As shown in FIGS. 2C and 2D, for the optimal viewing distance range [450 mm, 700 mm], the optimal layout period values for different distances may be calculated using the above calculation steps respectively. A crosstalk situation of the display device before optimization is shown in FIG. 2C, and a crosstalk situation of the optimized display device is shown in FIG. 2D, where a vertical axis represents the distance [450 mm, 1100 mm] of the human eye in the third direction, and a horizontal axis represents an angle range of [0°, 25°]. As shown in FIG. 2D, after the optimal layout period value is calculated and the controller controls the plurality of pixel units to periodically display the left eye image and the right eye image according to the determined same layout period, the crosstalk in most of the range of 7° to 15° may disappear, so that the display effect of the display device may be improved.

In the embodiments of the present disclosure, if at least two cylindrical lenses in the cylindrical lens array of the display device correspond to the same layout period, that is, the layout periods corresponding to the cylindrical lenses are partially or completely the same, then the layout period(s) corresponding to all cylindrical lenses is less than the layout period determined by Equation (1) mentioned above.

Figure 3A:
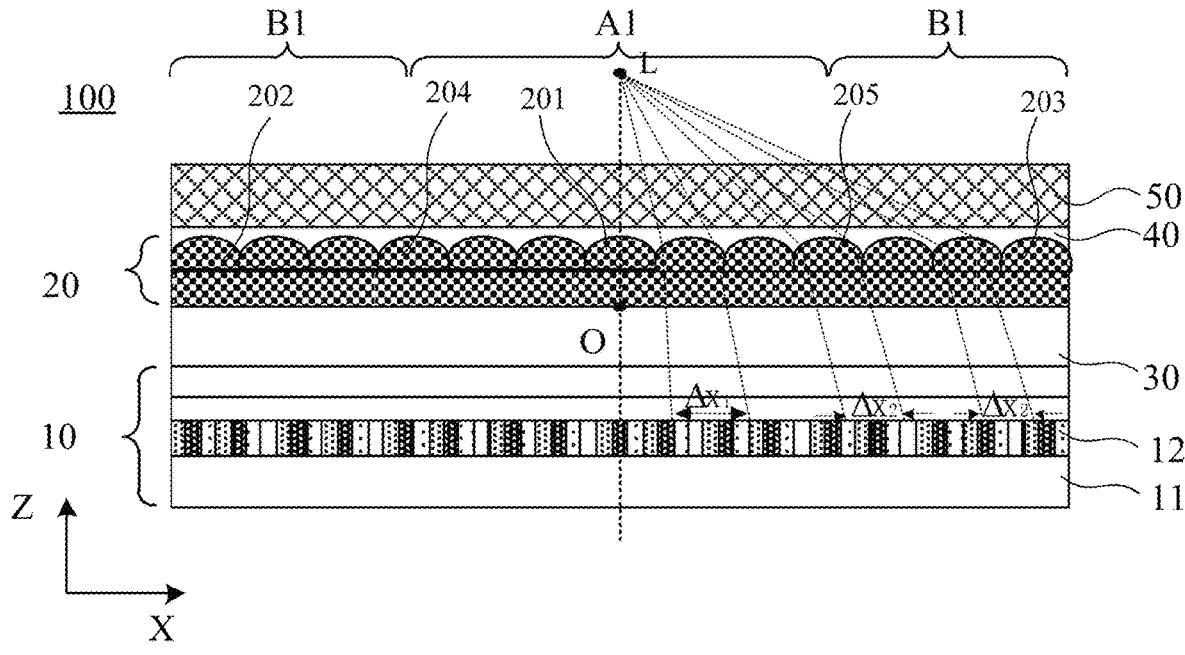
FIG. 3A schematically shows a schematic diagram of a cross-sectional structure of a stereoscopic display substrate in another embodiment of the present disclosure.
Figure 3B:
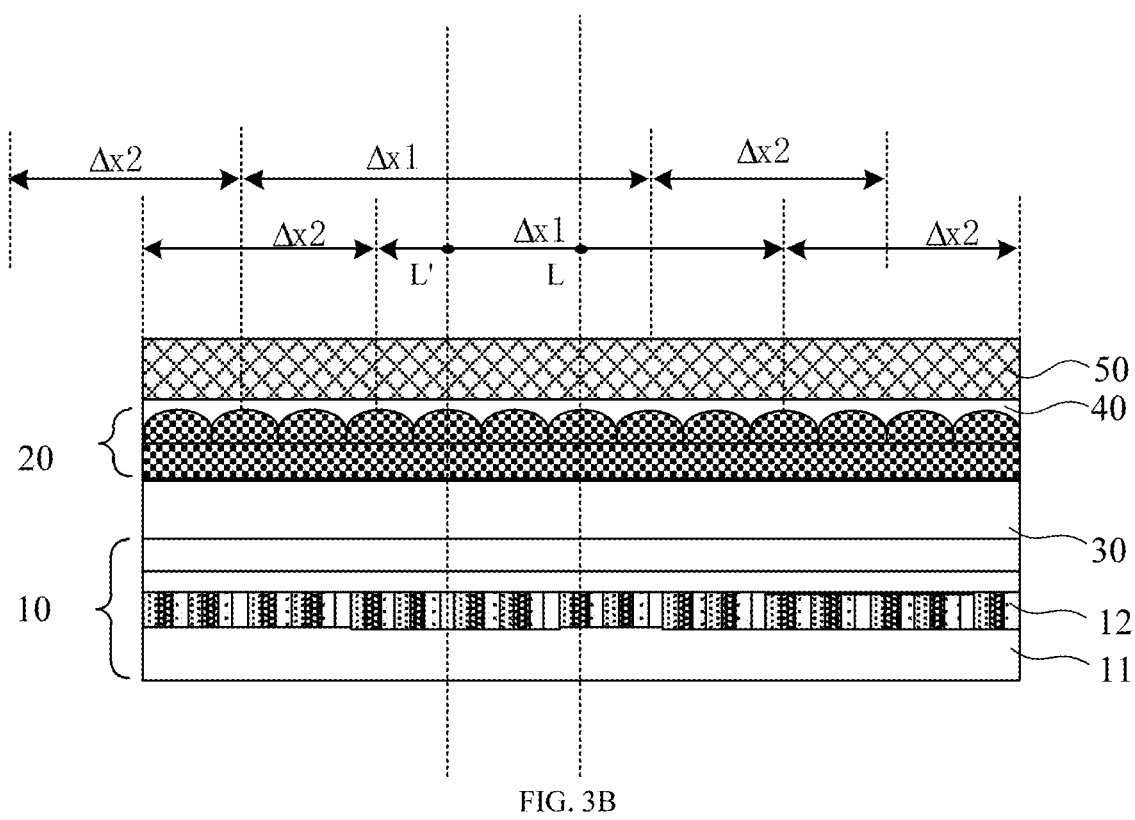
FIG. 3B schematically shows a schematic diagram of a layout period of a stereoscopic display substrate changing with a position of a human eye in an embodiment of the present disclosure.
Figure 3C:
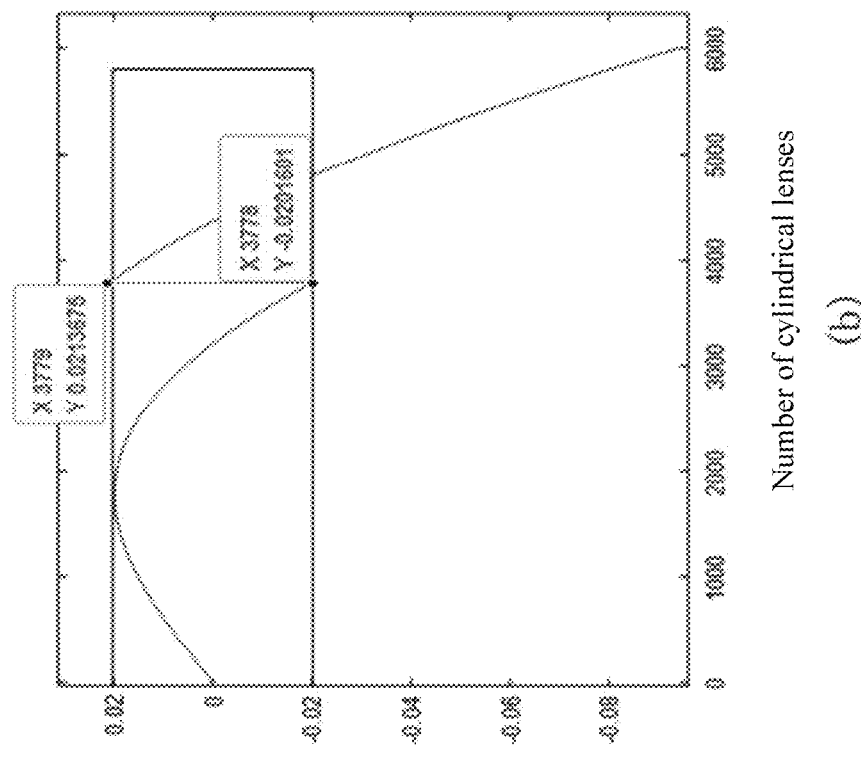
FIG. 3C schematically shows a schematic diagram of a comparison of change curves of a plurality of layout periods of a stereoscopic display substrate in another embodiment of the present disclosure.
Figure 3C:
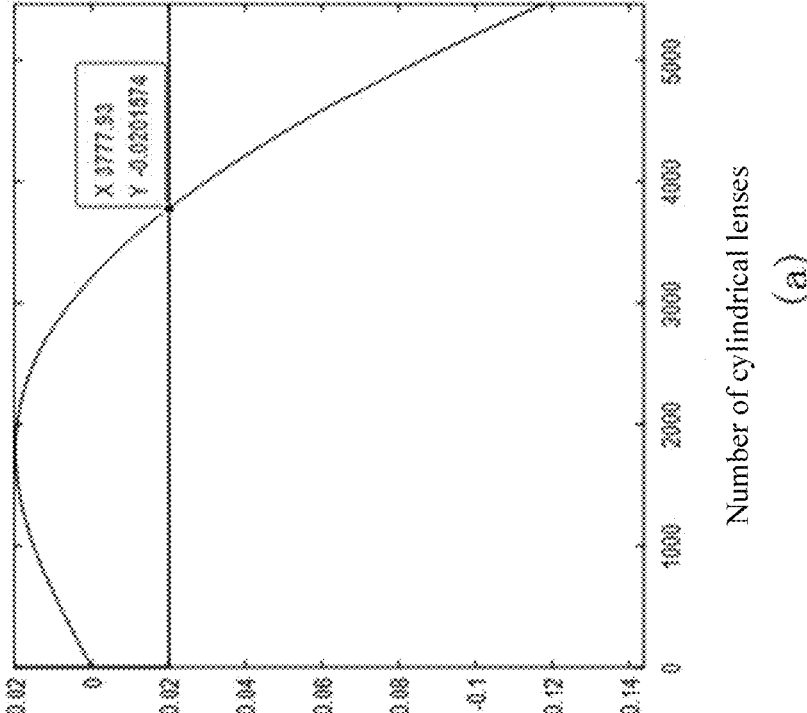

FIG. 3A schematically shows a schematic diagram of a cross-sectional structure of a stereoscopic display substrate in another embodiment of the present disclosure. FIG. 3B schematically shows a schematic diagram of a layout period of a stereoscopic display substrate changing with a position of a human eye in an embodiment of the present disclosure. FIG. 3C schematically shows a schematic diagram of a comparison of change curves of a plurality of layout periods of a stereoscopic display substrate in another embodiment of the present disclosure.

In another feasible embodiment, as shown in FIG. 3A, the plurality of cylindrical lenses include a central cylindrical lens 201, a first intermediate cylindrical lens 204, a second intermediate cylindrical lens 205, a left cylindrical lens 202, and a right cylindrical lens 203. The central cylindrical lens 201 is a cylindrical lens facing the human eye. The left cylindrical lens 202 and the right cylindrical lens 203 are two cylindrical lenses closest to edges of the display substrate in the first direction. The first intermediate cylindrical lens 204 and the second intermediate cylindrical lens 205 are located on both sides of the central cylindrical lens. The first intermediate cylindrical lens 204 is located between the central cylindrical lens 201 and the left cylindrical lens 202, and the second intermediate cylindrical lens 205 is located between the central cylindrical lens 201 and the right cylindrical lens 203.

Each cylindrical lens in a first group of cylindrical lenses A1 corresponds to a first layout period $\Delta x1$, and each cylindrical lens in a second group of cylindrical lenses B1 corresponds to a second layout period $\Delta x2$ different from the first layout period $\Delta x1$. The first group of cylindrical lenses A1 includes the cylindrical lenses continuously arranged in the first direction from the first intermediate cylindrical lens 204 to the second intermediate cylindrical lens 205, and the second group of cylindrical lenses B1 includes the cylindrical lenses continuously arranged in the first direction from the first intermediate cylindrical lens 204 to the left cylindrical lens 201 and the cylindrical lens continuously arranged in the first direction from the second intermediate cylindrical lens 205 to the right cylindrical lens 203.

As shown in FIG. 3A, the first layout period $\Delta x1$ corresponding to each cylindrical lens of the first group of cylindrical lenses A1 is greater than the second layout period $\Delta x2$ corresponding to each cylindrical lens of the second group of cylindrical lenses B1.

Exemplarily, the first layout period $\Delta x1$ corresponding to each cylindrical lens in the first group of cylindrical lenses A1 is determined using the optimal layout period corresponding to the distance coordinate $E_z$ of the human eye in the third direction Y as described above. That is, the first layout period $\Delta x1$ is calculated according to $E_z$ and Equation (2) to Equation (8). Then, according to the first layout period $\Delta x1$ and Equation (9) shown below, it is possible to calculate the second layout period $\Delta x2$ and the sequence number $k_{max}$ of the cylindrical lens between the first group of cylindrical lenses A1 and the second group of cylindrical lenses B1.

$$\begin{cases} y_{k=k_{max}}(k) - k_{max}\Delta x1 = -M \\ y_{k=k_{max}}(k) - k_{max}\Delta x2 = M \end{cases} \tag{9}$$

$k_{max}$ refers to a cylindrical lens where the layout period changes from the first layout period to the second layout period. In this embodiment, $k_{max}$ is a position with respect to the human eye, that is, the number of cylindrical lenses from the central cylindrical lens corresponding to the human eye in the first direction X.

As shown in FIG. 3B, assuming the distance $E_z$ of the human eye in the third direction is 700 mm, the position of the region corresponding to the first group of cylindrical lenses A1 with respect to the human eye is $[E_x-k_{max}, E_x-k_{max}]$, that is, the first layout period in the first group of cylindrical lenses A1 is fixed to $\Delta x1$. According to the above equation, it may be determined that $k_{max}=1990$, then the first layout period refers to the coordinate positions L [0,0,700] and L' [−326.41,0,700] of the human eye. According to the embodiments of the present disclosure, the change in the human eye position causes a change in the position of the first layout period $\Delta x1$ and the second layout period $\Delta x2$ displayed on the display substrate, so that a good viewing effect may be achieved at different positions of the human eye, and the crosstalk of the display device may be reduced.

As shown in FIG. 3C, the horizontal axis represents the number of cylindrical lenses, and the vertical axis represents a difference value (not an absolute value) between $y_k(k)$ and $y_{no}(k)$ in Equation (2).

As shown in (a) of FIG. 3C, in a case of calculating the first layout period $\Delta x1$ according to $E_z$ and Equation (2) to Equation (8), the display effect decreases when the number of cylindrical lenses from the central cylindrical lens corresponding to the human eye exceeds 4000. As shown in (b) of FIG. 3C, in a case of continuing to calculate the second layout period $\Delta x2$ according to Equation (9), the display effect does not decrease when the number of cylindrical lenses from the central cylindrical lens corresponding to the human eye exceeds 4000, and the display effect may decrease only when the number of cylindrical lenses from the central cylindrical lens corresponding to the human eye exceeds 5000. Therefore, by setting the first layout period $\Delta x1$ and the second layout period $\Delta x2$ respectively, the display effect of the display device may be effectively improved.

Figure 4A:
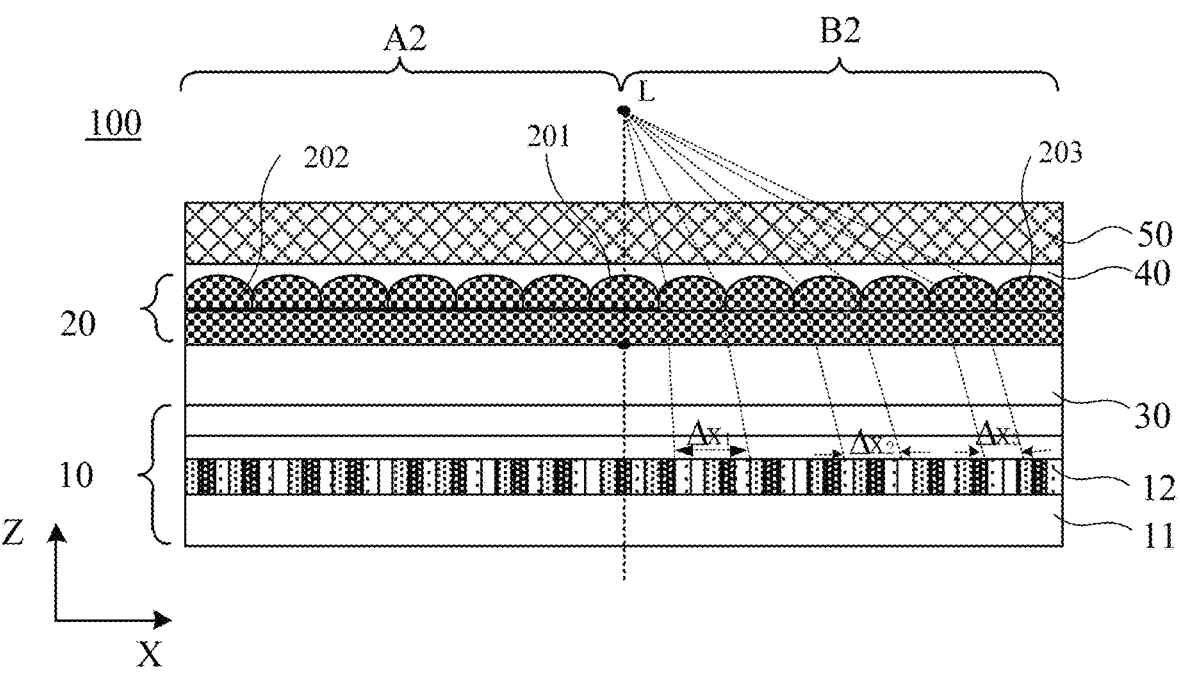
FIG. 4A schematically shows a schematic diagram of a cross-sectional structure of a stereoscopic display substrate in another embodiment of the present disclosure.
Figure 4B:
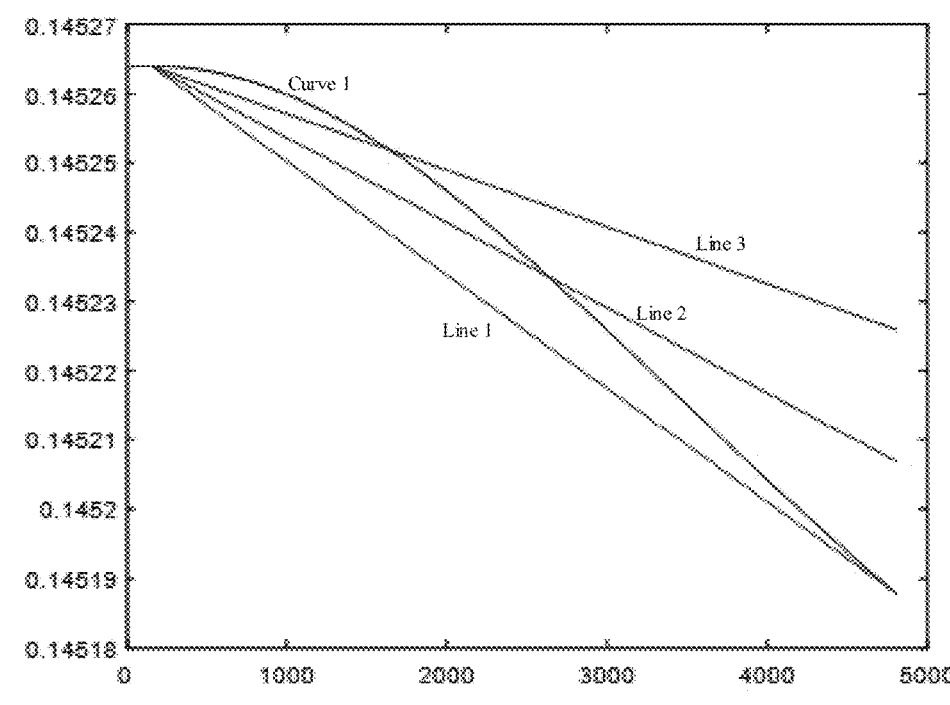
FIG. 4B schematically shows a diagram of the layout period changing with the number (i.e., position) of cylindrical lenses by considering an influence of cylindrical lens refraction.

FIG. 4A schematically shows a schematic diagram of a cross-sectional structure of a stereoscopic display substrate in another embodiment of the present disclosure. FIG. 4B schematically shows a schematic diagram of a change curve of linearly changing layout periods of a stereoscopic display substrate in another embodiment of the present disclosure.

In an exemplary embodiment of the present disclosure, at least two cylindrical lenses correspond to different layout periods. The layout period refers to a pixel width displayed by the pixel unit on the display substrate corresponding to the cylindrical lens.

As shown in FIG. 4A, the plurality of cylindrical lenses include a central cylindrical lens 201, a left cylindrical lens 202, and a right cylindrical lens 203. The central cylindrical lens 201 is a cylindrical lens for the human eye. The left cylindrical lens 202 and the right cylindrical lens 203 are two cylindrical lenses closest to edges of the display substrate in the first direction. The layout periods corresponding to the cylindrical lenses in the first group of cylindrical lenses A2 are different from each other, and the layout periods corresponding to the cylindrical lenses in the second group of cylindrical lenses B2 are different from each other. The first group of cylindrical lenses A2 includes the cylindrical lenses continuously arranged in the first direction from the central cylindrical lens 201 to the left cylindrical lens 202, and the second group of cylindrical lenses B2 includes the cylindrical lenses continuously arranged in the first direction from the central cylindrical lens 201 to the right cylindrical lens 203. That is, the layout periods of the first group of cylindrical lenses and the layout period of the second group of cylindrical lenses displayed on the display substrate controlled by the controller may be symmetrically distributed, for example, with a center of the central cylindrical lens 201 as a symmetry axis. In optional embodiments, the layout periods of the first group of cylindrical lenses and the layout period of the second group of cylindrical lenses displayed on the display substrate controlled by the controller may be asymmetric, that is, the layout periods of each group of cylindrical lenses have a different change pattern.

In an exemplary embodiment, as shown in FIG. 4A, the layout periods corresponding to the cylindrical lenses in the first group of cylindrical lenses A2 may change in a linear continuous manner, and the layout periods corresponding to the cylindrical lenses in the second group of cylindrical lenses B2 also change in a linear continuous manner. For example, a linear continuous change pattern of the layout periods corresponding to the cylindrical lenses in the first group of cylindrical lenses is the same as that of the layout periods corresponding to the cylindrical lenses in the second group of cylindrical lenses. In optional embodiments, the linear continuous change pattern of the layout periods corresponding to the cylindrical lenses in the first group of cylindrical lenses may also be different from that of the layout periods corresponding to the cylindrical lenses in the second group of cylindrical lenses.

Exemplarily, the linear continuous change pattern of the first group of cylindrical lenses A2 is the same as that of the second group of cylindrical lenses B2, and now only the linear continuous change of the second group of cylindrical lenses B2 is explained in detail. On the left side and the right side of the central cylindrical lens 201, with the central cylindrical lens 201 as a symmetrical center, the layout periods corresponding to the cylindrical lenses decrease in a direction towards both sides as the number of cylindrical lenses increases. A decreasing pattern of the layout period meets Equation (10).

$$\Delta x = \alpha \times \frac{\Delta x_{max} - \Delta x_{min}}{k_{max} - k_{min}} \times k \qquad (10)$$

where $\alpha$ is a correction coefficient, $$\Delta x_{max} = P \times \frac{E_z + h}{E_z},$$

$\Delta x_{min}$ represents a layout period corresponding to a maximum allowable pitch of the cylindrical lens, and k represents the number of cylindrical lenses from the central cylindrical lens in the first group of cylindrical lenses or the second group of cylindrical lenses.

For example, the number of cylindrical lenses in the first group of cylindrical lenses A1 or the second group of cylindrical lenses B1 is given as m, that is, a total number of cylindrical lenses from the central cylindrical lens 201 to the left cylindrical lens 202 is m, or the number of cylindrical lenses from the central cylindrical lens 201 to the right cylindrical lens 203 is m. It is possible to calculated $\Delta x_{min}$ according to the given number of cylindrical lenses m, the width P of the cylindrical lens and Equation (6) mentioned above, so as to determine the decreasing pattern of the layout periods according to Equation (10) mentioned above.

FIG. 4B schematically shows a diagram of the layout period changing with the number (i.e., position) of cylindrical lenses by considering an influence of cylindrical lens refraction. Exemplarily, as shown in FIG. 4B, Curve 1 represents a change of the theoretical layout period with the number (i.e., position) of cylindrical lenses by considering the influence of cylindrical lens refraction; Line 1, Line 2, and Line 3 respectively represent changes of the layout periods determined by Equation (10) with the number (i.e., position) of cylindrical lenses by considering the influence of cylindrical lens refraction, where Line 1, Line 2 and Line 3 correspond to different values of the correction coefficient $\alpha$ in Equation (10).

Exemplarily, as shown in Line 1, Line 2 and Line 3 in FIG. 4B, the layout periods corresponding to the cylindrical lenses in the first group of cylindrical lenses A2 decrease linearly, and the layout periods corresponding to the cylindrical lenses in the second group of cylindrical lenses B2 also decrease linearly.

In this embodiment, a is the correction coefficient, that is, a is a constant, and $0 < \alpha < 1$. FIG. 4B shows a change pattern of the layout period corresponding to each cylindrical lens when taking different values in (0,1) for $\alpha$. According to the curve shown in FIG. 4B, the layout period of each cylindrical lens in the first group of cylindrical lenses A2 is linearly negatively correlated with a first distance, which is a distance between each cylindrical lens in the first group of cylindrical lenses and the central cylindrical lens. The layout period corresponding to each cylindrical lens in the second group of cylindrical lenses B2 is linearly negatively correlated with a second distance, which is a distance between each cylindrical lens in the second group of cylindrical lenses and the central cylindrical lens.

According to the embodiments of the present disclosures, by setting the layout periods corresponding to the cylindrical lenses in the first group of cylindrical lenses A2 or the second group of cylindrical lenses B2 to change in a linear continuous manner, the crosstalk problem of the display device may be effectively reduced, and the display effect may be improved.

Figure 5A:
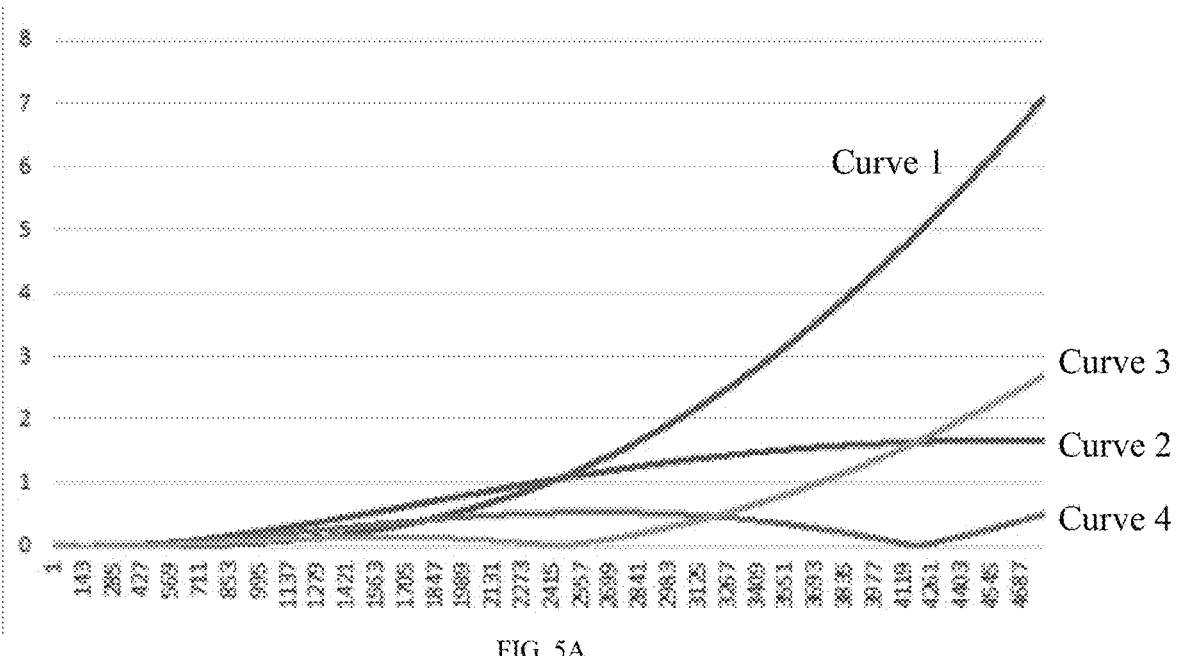
FIG. 5A schematically shows a curve diagram of a crosstalk rate to the number (i.e., position) of cylindrical lenses in several exemplary cases, in which a comparison between a crosstalk rate change under layout periods changing in a linear continuous manner and a crosstalk rate change under a fixed layout period is schematically shown.

FIG. 5A schematically shows a curve diagram of a crosstalk rate to the number (i.e., position) of cylindrical lenses in several exemplary cases, in which a comparison between a crosstalk rate change under layout periods changing in a linear continuous manner and a crosstalk rate change under a fixed layout period is schematically shown. As shown in FIG. 5A, Curve 1 represents a curve of the crosstalk rate to the number (i.e., position) of cylindrical lenses under the layout period determined by Equation (1), while Curve 2, Curve 3 and Curve 4 respectively represent curves of the crosstalk rate to the number (i.e., position) of cylindrical lenses under the layout period determined by Equation (10), where Curve 2 corresponds to a case of the correction coefficient $\alpha$ being 1, Curve 3 corresponds to a case of the correction coefficient $\alpha$ being $\frac{1}{2}$, and Curve 4 corresponds to a case of the correction coefficient $\alpha$ being $\frac{1}{4}$.

Figure 5B:
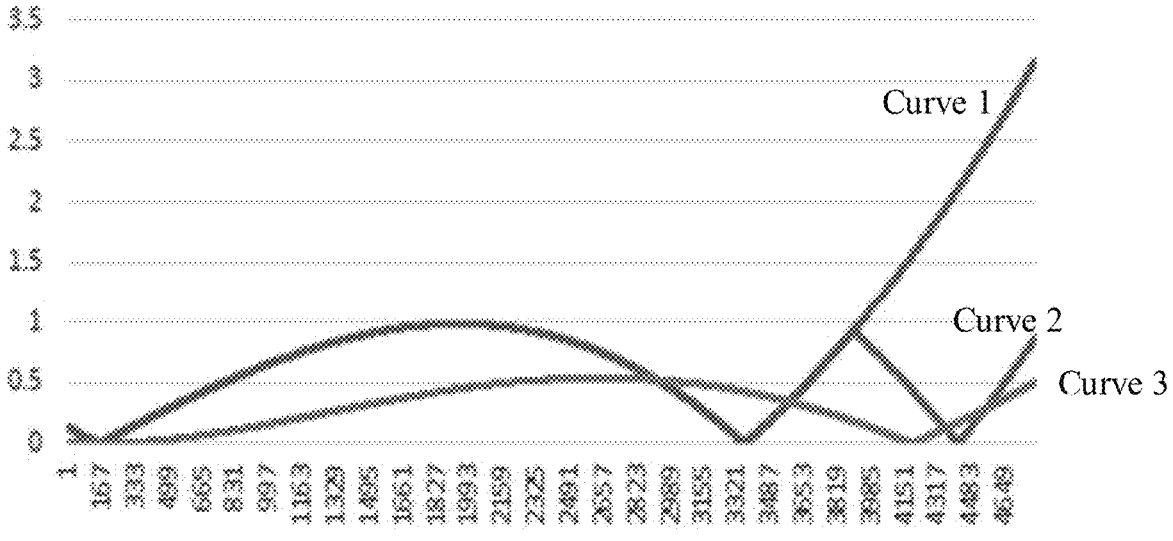
FIG. 5B schematically shows a curve diagram of a crosstalk rate to the number (i.e., position) of cylindrical lenses in several exemplary cases, in which a comparison of cross-talk rate changes under one layout period, two layout period, and layout periods changing in a linear continuous manner determined by considering an influence of cylindrical lens refraction is schematically shown.

FIG. 5B schematically shows a curve diagram of a crosstalk rate to the number (i.e., position) of cylindrical lenses in several exemplary cases, in which a comparison of cross-talk rate changes under one layout period, two layout period, and layout periods changing in a linear continuous manner determined by considering an influence of cylindrical lens refraction is schematically shown. As shown in FIG. 5B, Curve 1 represents a curve of the crosstalk rate to the number (i.e., position) of cylindrical lenses in case of one layout period determined by Equation (2) to Equation (8) by considering the influence of cylindrical lens refraction, Curve 2 represents a curve of the crosstalk rate to the number (i.e., position) of cylindrical lenses in case of two layout periods determined by Equation (9) by considering the influence of cylindrical lens refraction, and Curve 3 represents a curve of the crosstalk rate to the number (i.e., position) of cylindrical lenses in case of linearly continuously changing layout periods determined by Equation (10), where the correction coefficient $\alpha$ is $\frac{1}{4}$.

According to FIG. 5A and FIG. 5B, in the case of the layout period changing in a linear continuous manner, the crosstalk rate has a small value, and the curve of crosstalk rate change is smooth, then the problem of an obvious segmentation line in the optimal layout period may be solved.

Figure 6:
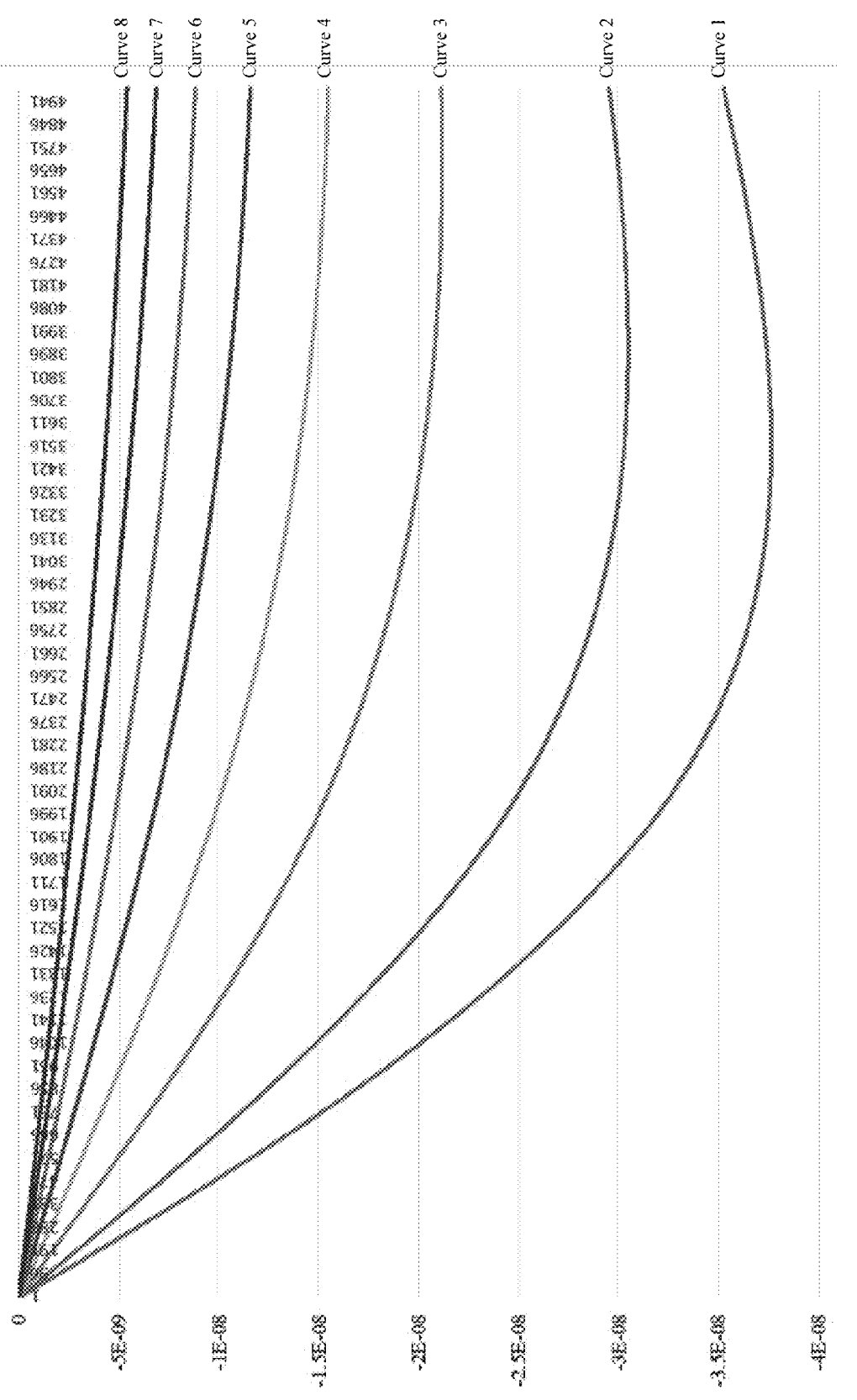
FIG. 6 schematically shows a schematic diagram of curves of the layout period of the cylindrical lenses to the number (i.e., position) of the cylindrical lenses of the stereoscopic display substrate for different viewing distances in an exemplary embodiment of the present disclosure.

FIG. 6 schematically shows a schematic diagram of curves of the layout period of the cylindrical lenses to the number (i.e., position) of the cylindrical lenses of the stereoscopic display substrate for different viewing distances in an exemplary embodiment of the present disclosure. For example, in FIG. 6, Curves 1 to 8 correspond to the curves of the layout period of cylindrical lenses to the number (i.e., position) of cylindrical lenses at viewing distances of 450 mm, 500 mm, 600 mm, 700 mm, 800 mm, 900 mm, 1000 mm, and 1100 mm, respectively.

In another exemplary embodiment, the layout periods corresponding to the cylindrical lenses in the first group of cylindrical lenses A2 change in a non-linear continuous manner, and the layout periods corresponding to the cylindrical lenses in the second group of cylindrical lenses B2 also change in a non-linear continuous manner.

Exemplarily, using the human eye position as an origin, a coordinate transformation may be performed on Equation (6) to obtain Equation (11).

$$y_k(k) = k \times P + \frac{h}{\sqrt{1 - \frac{1}{n^2} + \left(\frac{E_z}{k \times P}\right)^2}}; (k > 0) \qquad (11)$$

where P represents a pitch of adjacent cylindrical lenses, h represents an equivalent air distance between the cylindrical lens and the display unit, n represents a ratio of the refractive index $n_2$ of the cylindrical lens to the refractive index $n_1$ of the first dielectric layer, and $E_z$ represents a distance between the human eye and the central cylindrical lens in the first direction.

From the human eye position to both sides of the screen, the layout periods corresponding to the cylindrical lenses exhibit a non-linear continuous change. By using Equation (11), it is possible to obtain a distance coordinate $y_k$ of each cylindrical lens relative to the human eye in the first direction X. By using Equation (12) shown below, it is possible to determine a size of the non-linear layout period corresponding to each cylindrical lens.

$$\Delta x = y_k(k) - y_k(k-1) \qquad (12)$$

By controlling the pixel units of the display substrate to be arranged according to the layout period corresponding to each cylindrical lens determined by Equation (12), it is possible to obtain a stereoscopic image completely free of crosstalk in a case of a large viewing angle.

In some embodiments of the present disclosure, the layout periods corresponding to the cylindrical lenses in the first group of cylindrical lenses are non-linearly reduced, and the layout periods corresponding to the cylindrical lenses in the second group of cylindrical lenses are non-linearly reduced.

According to the embodiments of the present disclosure, by controlling the plurality of pixel units of the display substrate to be arranged according to the determined layout periods that change in a non-linear continuous manner, it is possible to completely eliminate the crosstalk problem of the display device, so that the display effect may be improved.

In some exemplary embodiments of the present disclosure, the display device further includes a human eye tracking module used to track a position of the human eye. The controller is further used to determine the relative positional relationship between the human eye, the cylindrical lens array and the display substrate according to the tracked position of the human eye.

In the embodiments of the present disclosure, for the required optimal viewing distance range of [450 mm, 700 mm], different non-linear change formulas may be obtained by using the above steps, and the size of the layout periods $\Delta x$ corresponding to different cylindrical lenses may be calculated according to the formulas. However, when the layout periods change linearly or non-linearly, since the human eye is the origin position of the layout period change, the layout periods of the entire display substrate may change with a change in the human eye position, such as a movement of the human eye in the first direction X and/or the third direction Y. Then, it is needed to rearrange the layout to achieve a good display effect for the human eye, which requires a lot of computing resources and is difficult to implement.

In this regard, in some embodiments of the present disclosure, the controller is further configured to: determine the layout periods and the layout period change rates for a plurality of predetermined viewing distances; establish a mapping relationship between the layout period change rate and each cylindrical lens for each predetermined viewing distance; acquire a human eye position in real time to determine a real-time viewing distance; acquire a position of the human eye in real time to determine a real-time viewing distance; determine a mapping relationship between the layout period change rate for a predetermined viewing distance closest to a determined real-time viewing distance and each cylindrical lens as a mapping relationship between the layout period change rate for the real-time viewing distance and each cylindrical lens; and calculate the layout period corresponding to each cylindrical lens for the real-time viewing distance according to the mapping relationship between the layout period change rate for the real-time viewing distance and each cylindrical lens.

For example, in order to facilitate a subsequent implementation of FPGA, it is needed to firstly obtain a difference in the changes of the layout period $\Delta x$ at different positions. For example, it is possible to select 450 mm, 500 mm, 600 mm, 700 mm, 800 mm, 900 mm, 1000 mm and 1100 mm in the viewing distance range of [450 mm, 1100 mm], solve sizes of $\Delta x$ corresponding to all cylindrical lenses using non-linear formulas respectively, and calculate a change rate of $\Delta x$, as shown in FIG. 6.

As shown in the figure, the change rate of the layout period $\Delta x$ is large in the range of [450, 600] but small in the range of [700, 1100]. Based on this conclusion, it is possible to select different layer segments to create a change rate table of the layout period $\Delta x$ for layer segments of 450 mm, 500 mm, 650 mm, 700 mm, 800 mm and 1000 mm. For any range, it is possible to select a closest change rate table (for example, a change rate table of 700 mm may be selected for 720 mm), and obtain the size of the layout period $\Delta x$ for different cylindrical lenses at that distance according to the change rate. According to the embodiments of the present disclosures, by establishing the mapping relationship between the layout period change rate and each cylindrical lens for each predetermined viewing distance and calculating the layout period corresponding to each cylindrical lens for a real-time viewing distance according to the mapping relationship between the layout period change rate and each cylindrical lens for the real-time viewing distance, an amount of computational data may be significantly reduced, and a data processing speed may be improved. In addition, such method may further effectively avoid a re-arrangement caused by a slight shaking during tracking of human eye, and facilitates an implementation of FPGA.

FIG. 7 schematically shows a flowchart diagram of a control method for a stereoscopic display substrate in an exemplary embodiment of the present disclosure.

As shown in FIG. 7, the control method includes operations S1 to S2.

In operation S1, a layout period is determined according to a relative positional relationship between a human eye, a cylindrical lens array and a display substrate and according to a refraction of the cylindrical lens array for light emitted by the plurality of pixel units.

In operation S2, the plurality of pixel units are controlled to periodically display a left eye image and a right eye image according to a determined layout period.

In some embodiments of the present disclosure, the control method further includes: tracking a position of the human eye; and determining the relative positional relationship between the human eye, the cylindrical lens array and the display substrate according to the tracked position of the human eye.

The display device in the aforementioned embodiments of the present disclosure may achieve the same beneficial effects as the above-mentioned display substrate, which will not be repeated here.

The above-mentioned display device may be any device that displays a moving image (such as video) or a fixed image (such as still image) and that displays a text or an image. More specifically, it is expected that the embodiments may be implemented in or associated with various electronic devices. The various electronic devices may include (but not be limited to) a mobile phone, a wireless device, a personal data assistant (PDA), a handheld or portable computer, a GPS receiver/navigator, a camera, an MP4 video player, a video camera, a game console, a watch, a clock, a calculator, a television monitor, a flat panel display, a computer monitor, a vehicle display (such as odometer display), a navigator, a cockpit controller and/or a display, a display for camera view (such as display of rear view camera in vehicle), an electronic photo, an electronic billboard or sign, a projector, an architectural structure, a packaging and aesthetic structure (such as display for image of jewelry), etc.

Although some embodiments of the general concept of the present disclosure have been schematically illustrated and explained, those ordinary skilled in the art may understand that changes may be made to those embodiments without departing from a principle and spirit of the general inventive concept. The scope of the present disclosure is limited by the claims and their equivalents.

What is claimed is:

1. A stereoscopic display device, comprising:
a display substrate, comprising a base substrate and a plurality of pixel units provided on the base substrate, wherein the plurality of pixel units are arranged in an array in a first direction and a second direction intersecting with the first direction;
a cylindrical lens array located on a light exit side of the display substrate; and
a controller configured to: determine a layout period according to a relative positional relationship between a human eye, the cylindrical lens array and the display substrate and according to a refraction of the cylindrical lens array for light emitted by the plurality of pixel units; and control the plurality of pixel units to periodically display a left eye image and a right eye image according to a determined layout period,
wherein the cylindrical lens array comprises a plurality of cylindrical lenses arranged in the first direction;
wherein a design point on a cylindrical lens corresponds to a first light exit point and a second light exit point on a light exit surface of the display substrate, light emitted from the first light exit point and incident on the design point enters the human eye after being refracted by the cylindrical lens, and the second light exit point, the design point and the human eye are located on a same straight line; and
wherein the controller is configured to determine the layout period such that a distance between the first light exit point and the second light exit point in the first direction is less than or equal to a specified value, so as to avoid a crosstalk between images displayed by two adjacent layout units, and the layout unit comprises at least one pixel unit configured to display the left eye image or the right eye image, and a plurality of layout units are periodically arranged in the first direction according to the layout period.

2. The stereoscopic display device according to claim 1, wherein the controller is configured to determine a plurality of layout periods, the cylindrical lens array comprises a plurality of cylindrical lenses arranged in the first direction, and the plurality of layout periods correspond to the plurality of cylindrical lenses respectively; and
wherein at least two cylindrical lenses correspond to different layout periods.

3. The stereoscopic display device according to claim 2, wherein the plurality of cylindrical lenses comprise a central cylindrical lens, a left cylindrical lens and a right cylindrical lens, the central cylindrical lens is a cylindrical lens for the human eye, and the left cylindrical lens and the right cylindrical lens are two cylindrical lenses closest to edges of the display substrate in the first direction respectively; and
wherein the layout periods corresponding to cylindrical lenses in a first group of cylindrical lenses are different from each other, and/or the layout periods corresponding to cylindrical lenses in a second group of cylindrical lenses are different from each other, the first group of cylindrical lenses comprises cylindrical lens continuously arranged in the first direction from the central cylindrical lens to the left cylindrical lens, and the second group of cylindrical lenses comprises cylindrical lens continuously arranged in the first direction from the central cylindrical lens to the right cylindrical lens.

4. The stereoscopic display device according to claim 3, wherein the layout periods corresponding to the cylindrical lenses in the first group of cylindrical lenses change in a linear continuous manner, and/or the layout periods corresponding to the cylindrical lenses in the second group of cylindrical lenses change in a linear continuous manner.

5. The stereoscopic display device according to claim 4, wherein the layout periods corresponding to the cylindrical lenses in the first group of cylindrical lenses are linearly reduced, and/or the layout periods corresponding to the cylindrical lenses in the second group of cylindrical lenses are linearly reduced.

6. The stereoscopic display device according to claim 4, wherein the layout period corresponding to each cylindrical lens in the first group of cylindrical lenses is linearly negatively correlated with a first distance, and the first distance is a distance between each cylindrical lens in the first group of cylindrical lenses and the central cylindrical lens; and/or the layout period corresponding to each cylindrical lens in the second group of cylindrical lenses is linearly negatively correlated with a second distance, and the second distance is a distance between each cylindrical lens in the second group of cylindrical lenses and the central cylindrical lens, wherein a linear correlation determined by the controller meets:

$$\Delta x = \alpha \times \frac{\Delta x_{max} - \Delta x_{min}}{k_{max} - k_{min}} \times k$$

where $\alpha$ is a correction coefficient $$\Delta x_{max} = P \times \frac{E_z + h}{E_z},$$

$\Delta x_{min}$ represents a layout period corresponding to a maximum allowable pitch of the cylindrical lenses, and k represents a number of the cylindrical lenses from the central cylindrical lens in the first group of cylindrical lenses or the second group of cylindrical lenses.

7. The stereoscopic display device according to claim 3, wherein the layout periods corresponding to the cylindrical lenses in the first group of cylindrical lenses change in a non-linear continuous manner, and/or the layout periods corresponding to the cylindrical lenses in the second group of cylindrical lenses change in a non-linear continuous manner.

8. The stereoscopic display device according to claim 7, wherein the layout periods corresponding to the cylindrical lenses in the first group of cylindrical lenses are non-linearly reduced, and/or the layout periods corresponding to the cylindrical lenses in the second group of cylindrical lenses are non-linearly reduced.

9. The stereoscopic display device according to claim 7, wherein the layout period corresponding to each cylindrical lens in the first group of cylindrical lenses is a pitch of two layout units corresponding to two adjacent cylindrical lenses; and/or wherein the layout period corresponding to each cylindrical lens in the second group of cylindrical lenses is a pitch of two layout units corresponding to two adjacent cylindrical lenses, wherein the layout period corresponding to each cylindrical lens in the first group of cylindrical lenses and/or the layout period corresponding to each cylindrical lens in the second group of cylindrical lenses meet:

$$y_k(k) = k \times P + \frac{h}{\sqrt{1 - \frac{1}{n^2} + \left(\frac{E_z}{k \times P}\right)^2}}; (k > 0)$$

$$\Delta x = y_k(k) - y_k(k - 1)$$

where P represents a pitch of adjacent cylindrical lenses, h represents an equivalent air distance between the cylindrical lens and the display unit, n represents a ratio of a refractive index $n_2$ of the cylindrical lens to a refractive index $n_1$ of a first dielectric layer, and $E_x$ represents a distance between the human eye and the central cylindrical lens in the first direction.

10. The stereoscopic display device according to claim 1, wherein the controller is configured to determine a plurality of layout periods, the cylindrical lens array comprises a plurality of cylindrical lenses arranged in the first direction, and the plurality of layout periods correspond to the plurality of cylindrical lenses respectively; and wherein at least two cylindrical lenses correspond to a same layout period.

11. The stereoscopic display device according to claim 10, wherein the plurality of cylindrical lenses correspond to a same layout period.

12. The stereoscopic display device according to claim 10, wherein each cylindrical lens corresponds to a layout period less than a layout period determined by:

$$\Delta x = P \times \frac{E_z + h}{E_z}$$

where $E_z$ represents a viewing distance between the human eye and the stereoscopic display device, P represents a pitch of adjacent cylindrical lenses, and h represents an equivalent air distance between the cylindrical lens and the display unit.

13. The stereoscopic display device according to claim 10, wherein the plurality of cylindrical lenses comprise a central cylindrical lens, a first intermediate cylindrical lens, a second intermediate cylindrical lens, a left cylindrical lens and a right cylindrical lens, the central cylindrical lens is a cylindrical lens for the human eye, the left cylindrical lens and the right cylindrical lens are two cylindrical lenses closest to edges of the display substrate in the first direction, the first intermediate cylindrical lens and the second intermediate cylindrical lens are located on both sides of the central cylindrical lens, the first intermediate cylindrical lens is located between the central cylindrical lens and the left cylindrical lens, and the second intermediate cylindrical lens is located between the central cylindrical lens and the right cylindrical lens; and wherein each cylindrical lens in the first group of cylindrical lenses corresponds to a first layout period, each cylindrical lens in the second group of cylindrical lenses corresponds to a second layout period different from the first layout period, the first group of cylindrical lenses comprises cylindrical lenses arranged continuously in the first direction from the first intermediate cylindrical lens to the second intermediate cylindrical lens, the second group of cylindrical lenses comprises cylindrical lenses arranged continuously in the first direction from the first intermediate cylindrical lens to the left cylindrical lens and cylindrical lenses arranged continuously in the first direction from the second intermediate cylindrical lens to the right cylindrical lens.

14. The stereoscopic display device according to claim 13, wherein the first layout period is greater than the second layout period.

15. The stereoscopic display device according to claim 14, further comprising:

a human eye tracking module configured to track a position of the human eye;

wherein the controller is further configured to determine the relative positional relationship between the human eye, the cylindrical lens array and the display substrate according to a tracked position of the human eye.

16. The stereoscopic display device according to claim 15, wherein the controller is further configured to:

determine layout periods and layout period change rates for a plurality of predetermined viewing distances respectively;

establish a mapping relationship between the layout period change rate for each predetermined viewing distance and each cylindrical lens;

acquire a position of the human eye in real time to determine a real-time viewing distance;

determine a mapping relationship between the layout period change rate for a predetermined viewing distance closest to the determined real-time viewing distance and each cylindrical lens as a mapping relationship between the layout period change rate for the real-time viewing distance and each cylindrical lens; and calculate the layout period corresponding to each cylindrical lens for the real-time viewing distance according to the mapping relationship between the layout period change rate for the real-time viewing distance and each cylindrical lens.

17. The stereoscopic display device according to claim 14, wherein a distance $y_k$ between the first light exit point corresponding to the design point of the cylindrical lens and the central cylindrical lens meets:

$$y_k(k) = k \times P + hn \tan\theta_2$$

where $\theta_2$ represents an angle between a light ray in the cylindrical lens and a normal line, wherein a distance $y_{no}$ between the second light exit point corresponding to the design point of the cylindrical lens and the central cylindrical lens meets:

$$y_{no}(k) = (k-1) \times \Delta x + E_x \bmod \Delta x; E_x > 0$$

$$y_{no}(k) = k \times \Delta x + E_x \bmod \Delta x; E_x < 0$$

where $E_x$ represents a distance between the human eye and the central cylindrical lens in the first direction, wherein a distance between the first light exit point corresponding to the design point of the cylindrical lens and the central cylindrical lens, the first layout period $\Delta x1$ in the first group of cylindrical lenses and the second layout period $\Delta x2$ in the second group of cylindrical lenses meet:

$$\begin{cases} y_{k=k_{max}}(k) - k_{max}\Delta x1 = -M \\ y_{k=k_{max}}(k) - k_{max}\Delta x2 = M \end{cases}$$

where M is the specified value, $k_{max}$ represents a number of cylindrical lenses from the central cylindrical lens to the first intermediate cylindrical lens or to the second intermediate cylindrical lens, $\Delta x1$ represents the layout period corresponding to the first group of cylindrical lenses, and $\Delta x2$ represents the layout period corresponding to the second group of cylindrical lenses.

18. A control method for a stereoscopic display device, wherein the stereoscopic display device comprises: a display substrate, comprising a base substrate and a plurality of pixel units provided on the base substrate, wherein the plurality of pixel units are arranged in an array in a first direction and a second direction intersecting with the first direction; and a cylindrical lens array located on a light exit side of the display substrate; the control method comprising:

determining a layout period according to a relative positional relationship between a human eye, the cylindrical lens array and the display substrate and according to a refraction of the cylindrical lens array for light emitted by the plurality of pixel units; and controlling the plurality of pixel units to periodically display a left eye image and a right eye image according to a determined layout period, wherein the cylindrical lens array comprises a plurality of cylindrical lenses arranged in the first direction;

wherein a design point on a cylindrical lens corresponds to a first light exit point and a second light exit point on a light exit surface of the display substrate, light emitted from the first light exit point and incident on the design point enters the human eye after being refracted by the cylindrical lens, and the second light exit point, the design point and the human eye are located on a same straight line; and wherein the controller is configured to determine the layout period such that a distance between the first light exit point and the second light exit point in the first direction is less than or equal to a specified value, so as to avoid a crosstalk between images displayed by two adjacent layout units, and the layout unit comprises at least one pixel unit configured to display the left eye image or the right eye image, and a plurality of layout units are periodically arranged in the first direction according to the layout period.

19. The control method according to claim 18, further comprising:

tracking a position of the human eye; and determining the relative positional relationship between the human eye, the cylindrical lens array and the display substrate according to a tracked position of the human eye.

\* \* \* \* \*